United States Patent
Burdick et al.

(10) Patent No.: US 10,707,808 B2
(45) Date of Patent: *Jul. 7, 2020

(54) SOLAR MODULE MOUNTING AND SUPPORT SYSTEM

(71) Applicant: PowerField Energy Inc., Washington, DC (US)

(72) Inventors: Paul Burdick, Arlington, VA (US); David Flory, Falls Church, VA (US)

(73) Assignee: PowerField Energy Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,226

(22) Filed: Aug. 29, 2018

(65) Prior Publication Data
US 2019/0068115 A1    Feb. 28, 2019

Related U.S. Application Data

(63) Continuation of application No. 15/626,025, filed on Jun. 16, 2017, now Pat. No. 10,090,802.

(60) Provisional application No. 62/412,891, filed on Oct. 26, 2016, provisional application No. 62/351,593, filed on Jun. 17, 2016.

(51) Int. Cl.
| | |
|---|---|
| *H02S 30/10* | (2014.01) |
| *H02S 20/30* | (2014.01) |
| *F24S 25/634* | (2018.01) |
| *F24S 25/11* | (2018.01) |
| *H02S 20/10* | (2014.01) |
| *F24S 25/00* | (2018.01) |

(52) U.S. Cl.
CPC ............ *H02S 30/10* (2014.12); *F24S 25/11* (2018.05); *F24S 25/634* (2018.05); *H02S 20/10* (2014.12); *H02S 20/30* (2014.12); *F24S 2025/02* (2018.05); *Y02E 10/47* (2013.01); *Y02E 10/50* (2013.01)

(58) Field of Classification Search
None
See application file for complete search history.

(56) References Cited

U.S. PATENT DOCUMENTS

| | | |
|---|---|---|
| 41,486 A | 2/1864 | Cook |
| 493,194 A | 3/1893 | Stifel |
| (Continued) | | |

FOREIGN PATENT DOCUMENTS

| | | |
|---|---|---|
| CA | 2701864 A1 | 10/2011 |
| EP | 0857926 A1 | 8/1998 |
| JP | 5677218 B2 | 2/2015 |

OTHER PUBLICATIONS

European Patent Office, Extended Search Report for European Patent Application No. EP17814231.1, dated Jan. 22, 2020, 6 pages.

*Primary Examiner* — Eli S Mekhlin
(74) *Attorney, Agent, or Firm* — Mintz Levin Cohn Ferris Glovsky and Popeo, P.C.

(57) ABSTRACT

An apparatus for mounting and supporting one or more solar modules are provided. The apparatus can include a front wall and a rear wall. The apparatus can further include a curved surface that joins the front wall and the rear wall to form a base of the apparatus. The base of the apparatus can have a curved bottom. Furthermore, the base of the apparatus can be configured to mount and support the one or more solar modules. Related methods are also provided.

20 Claims, 27 Drawing Sheets

(56) References Cited

U.S. PATENT DOCUMENTS

| | | | |
|---|---|---|---|
| 1,161,137 A | 11/1915 | Lane | |
| 1,887,663 A | 11/1932 | Reed, Jr. | |
| 6,105,316 A | 8/2000 | Bottger et al. | |
| 7,730,676 B2 | 6/2010 | Hon | |
| 9,570,650 B2 | 2/2017 | Vesborg | |
| 10,090,802 B2 * | 10/2018 | Burdick | F24S 25/11 |
| 2004/0221524 A1 | 11/2004 | Poddany et al. | |
| 2009/0025708 A1 | 1/2009 | Shingleton | |
| 2009/0133689 A1 | 5/2009 | Conchy et al. | |
| 2011/0067691 A1 | 3/2011 | Bellacicco et al. | |
| 2013/0068275 A1 | 3/2013 | Swahn et al. | |
| 2014/0290720 A1 | 10/2014 | Hockaday | |
| 2015/0136205 A1 | 5/2015 | Worden | |
| 2016/0173026 A1 | 6/2016 | Goei | |

* cited by examiner

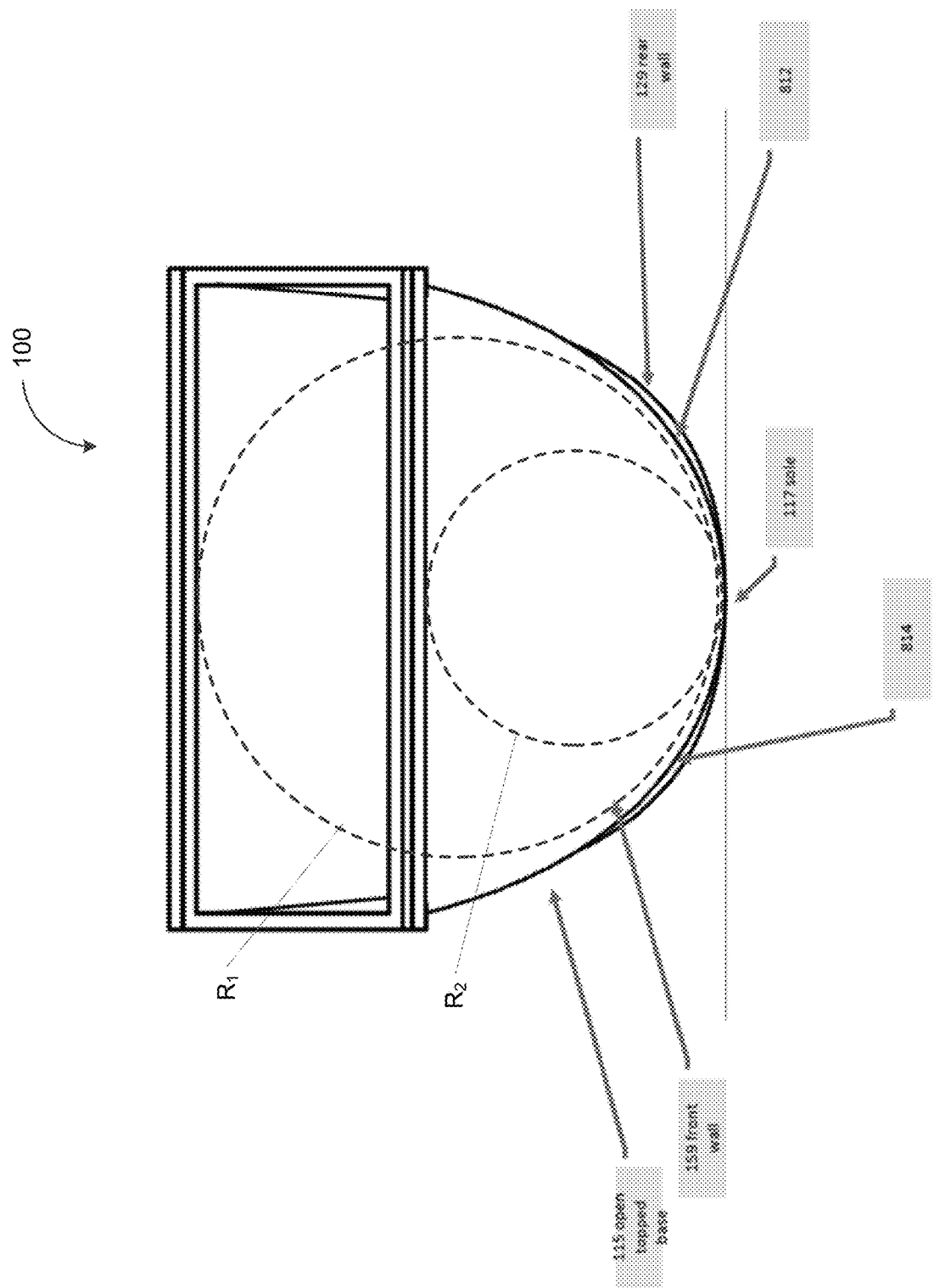

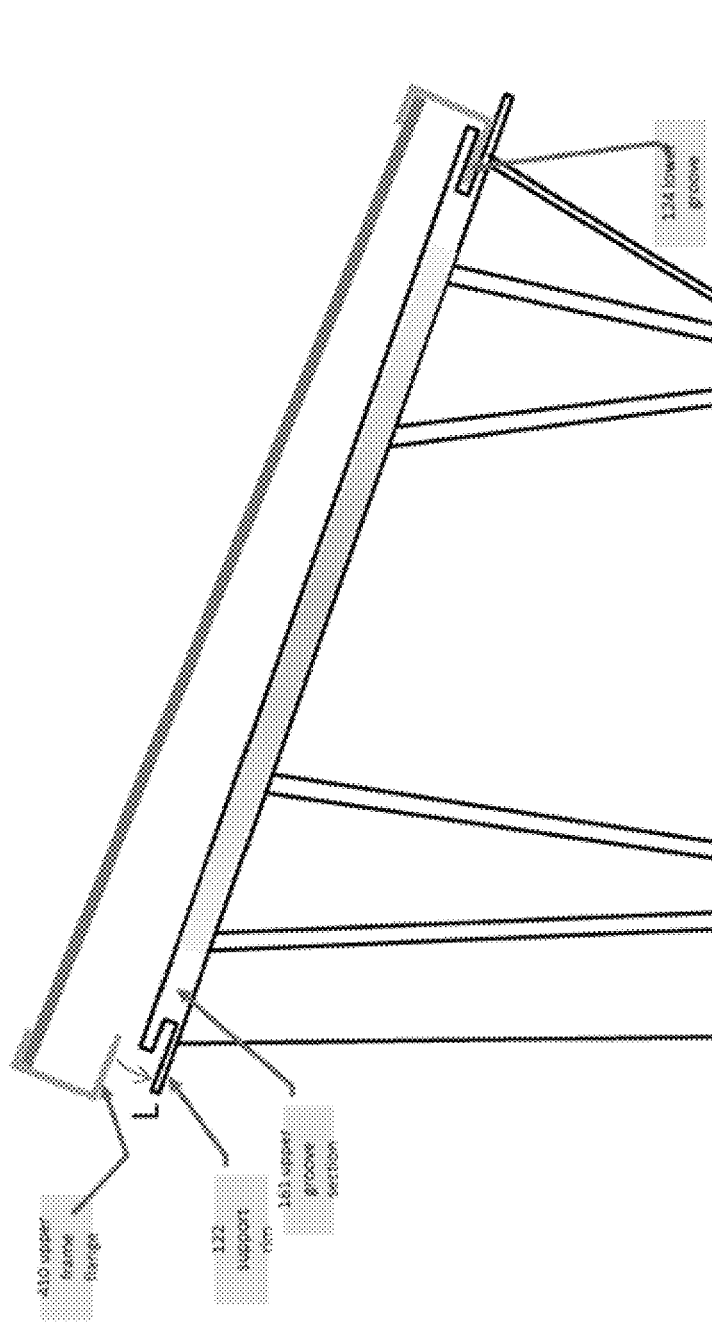

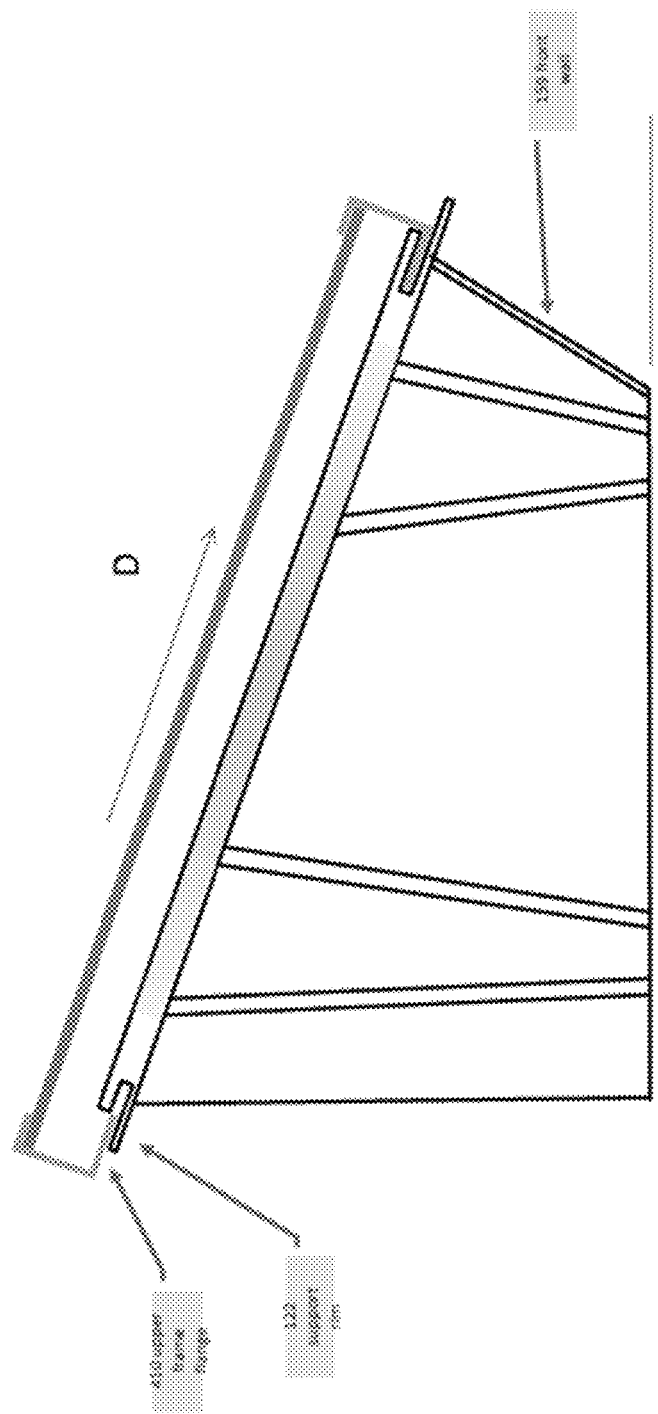

SOLAR MODULE MOUNTING AND SUPPORT SYSTEM

RELATED APPLICATION

This application is a Continuation Application of Ser. No. 15/626,025 filed Jun. 16, 2017, now U.S. Pat. No. 10,090,802 issued Oct. 2, 2018, entitled "SOLAR MODULE MOUNTING AND SUPPORT SYSTEM," which claims priority to U.S. Provisional Application No. 62/351,593 filed Jun. 17, 2016, entitled "POWERFIELD SOLAR MODULE MOUNTING, BALLASTING, AND CLIP SYSTEM," and U.S. Provisional Application No. 62/412,891 filed on Oct. 26, 2016, entitled: BALLASTED SUPPORT AND MOUNTING SYSTEMS FOR SOLAR PANELS," disclosures of which are incorporated herein by reference in their entirety.

TECHNICAL FIELD

This invention relates generally to renewable energy, and more specifically to a system for mounting, supporting, and securing solar modules.

BACKGROUND

Alternative energy sources have become important to the economic and environmental well-being of society. Solar energy, in particular, provides a sustainable, renewable, and natural source of electrical power. Improvements in solar module and inverter technology continue to increase the efficiency of solar energy collection and its conversion to alternating current electrical energy.

SUMMARY

Methods, and articles of manufacture, including apparatuses, are provided for mounting, supporting, and securing one or more solar modules. In some example embodiments, there is provided an apparatus for mounting, supporting, and securing a solar module. The apparatus can include: a front wall; a rear wall disposed across from the front wall; and a curved surface joining the front wall and the rear wall to form a base of the apparatus. The base of the apparatus can have a curved bottom. The apparatus can be configured to mount and support the one or more solar modules.

In some variations, one or more features disclosed herein including the following features can optionally be included in any feasible combination. The radius of the curvature of the curved bottom can change along an axis that is parallel to the front wall and/or the rear wall. The radius of the curvature of the curved bottom changes along an axis that is perpendicular to the front wall and/or the rear wall.

In some variations, the base can be hollow. The base can be configured to accommodate, within a cavity of the base, one or more types of ballast. The cavity of the base can be divided into a plurality of compartments. One or more of the plurality compartments can be configured to accommodate the one or more types of ballast. The base can further include one or more protrusions and/or recesses along the front wall, the rear wall, and/or the curved surface joining the front wall and the rear wall. The one or more protrusions and/or recesses can be configured to receive at least one divider for dividing the cavity of the base into the plurality of compartments.

In some variations, the base can include a support rim along a top perimeter of the base. The support rim can include an upper support rim and a lower support rim. The upper support rim and the lower support rim can be separated by a groove. The one or more solar modules can be attached to the base via the groove. The lower support rim further includes one or more holes. The one or more holes can be positioned on a portion of the lower support rim along the rear wall of the base. The one or more holes can be configured to receive one or more pins and/or lugs. The one or more pins and/or lugs can be inserted into the one or more holes to secure the one or more solar modules to the base.

In some variations, the support rim can include a rear flange along the rear wall of the base and a front flange near the front wall of the base. The rear flange can be configured to engage with a top clip. The front flange can be configured to engage with a bottom clip. The one or more solar modules can be attached to the base via the top clip and the bottom clip. The top clip can include a first channel and the second clip can include a second channel. The first channel and the second channel can be configured to receive a frame of the one or more solar modules. The first channel and/or the second channel can include a cushion element.

In some variations, the support rim can include one or more recesses and/or protrusions configured to enable a dispersion of heat and/or moisture. The support rim and the base can be molded as a single piece. The support rim can be separate and detachable from the base. The front wall of the base can be lower than the rear wall of the base to form a slope across a top of the base. The one or more solar modules can be angled along the slope across the top of the base.

In some example embodiments, there is provided a method for installing one or more solar modules. The method may include attaching a first solar module to a first mounting and support system. The method may further include attaching a second solar module to the first mounting and support system. The first mounting and support system can mount and support both the first solar module and the second solar module.

In some variations, the method may include attaching the first solar module to a second mounting and support system. The first solar module can be mounted on and supported by both the first mounting and support system and the second mounting and support system.

Implementations of the current subject matter can include, but are not limited to, apparatuses consistent with the descriptions provided herein. The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 1D depicts a front view of a ballasted support and mounting system consistent with some implementations of the current subject matter;

FIG. 4C depicts an installation of a solar panel via a groove-based attachment system consistent with some implementations of the current subject matter;

FIG. 4D depicts an installation of a solar panel via a groove-based attachment system consistent with some implementations of the current subject matter;

DETAILED DESCRIPTION

Figure 1A:
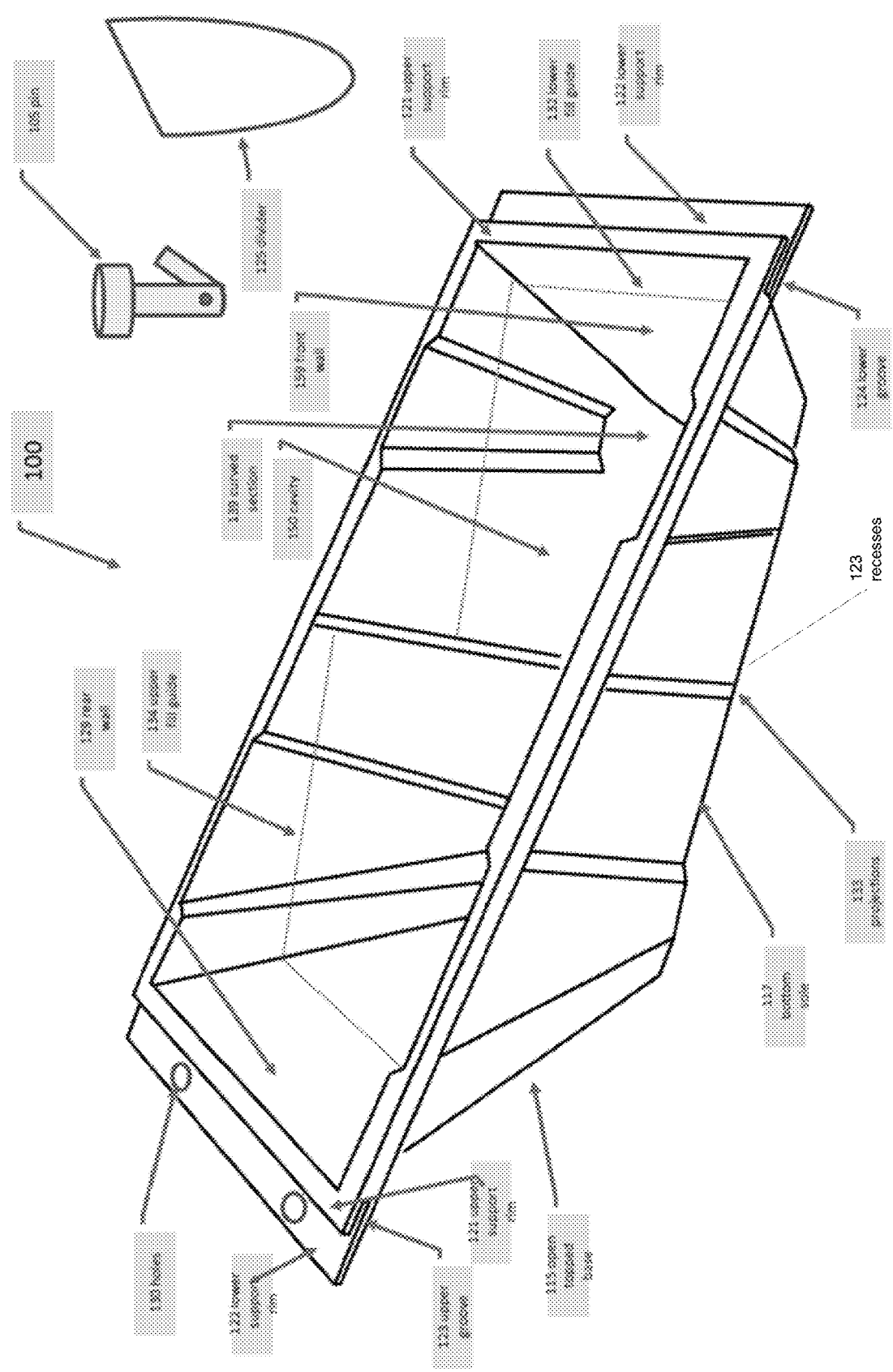
FIG. 1A depicts a perspective view of a ballasted support and mounting system consistent with some implementations of the current subject matter.

Solar modules, such as photovoltaic cell (PVC) panels, are typically ground-mounted on a racking system having numerous components including, for example, metal pieces, specialized fixtures, threaded fasteners, and/or the like. These features of conventional racking systems make installation of solar modules time consuming and tedious as well as difficult to remove and upgrade. Currently the vast majority of conventional ground mount racking systems are permanent structures that require extensive and environmentally invasive installation efforts including ground penetration. Thus, despite improvements to solar module and inverter technology, widespread proliferation of solar energy, especially in developing regions, is hindered by the prohibitive cost and complexity associated with installing solar modules. Be it an industrial scale solar farm or a small scale installation, the design, development, permitting, construction, commission, financing, operation, and maintenance of a conventionally installed solar system often entail significant efforts by a panoply of specialists including engineers, lawyers, financiers, and consultants. As such, in some implementations of the current subject matter, solar modules can be installed using a ballasted support and mounting system instead of a conventional racking system.

In some implementations of the current subject matter, the ballasted support and mounting system can include at least one free-standing container configured to mount and support one or more solar modules such as photovoltaic cell (PVC) panels or modules. The free-standing container can include an open-top, hollow base, which can be filled with any type of ballast including, for example, concrete, cinder blocks, aggregates, sand, loose soil, and/or the like. The mass of the ballast can serve to anchor the free-standing container on an installation surface without any permanent and/or invasive modifications such as, for example, ground penetration. Furthermore, the front wall and the back wall of the base can be of different heights to form a slope along the opening of the free-standing container. This slope can position the solar modules attached to the free-standing container at an angle that maximizes exposure to solar radiation.

In some implementations of the current subject matter, the ballasted support and mounting system can be configured to mount and support solar modules without any metal components and/or threaded fasteners. For example, solar modules can be secured to the free-standing container using attachment clips instead of threaded fasteners. Such clips can be either separate components or fabricated integral to the support mounting system. Furthermore, the bottom and sides of the support base can form one continuous curved surface. This curvature can allow the free-standing container to be adjusted during installation as well as to accommodate rough and/or uneven installation surfaces. Variations in the radii of the curvature can allow the free-standing container to self-stabilize by preventing the free-standing container from rolling over onto any one side yet is easy to manipulate into the correct orientation by installers. It should be appreciated that installing solar modules using the ballasted support and mounting system does not require any specialized labor, tools, or significant environmental modifications such as ground penetration. Moreover, the resulting solar system can be deployed, removed, re-deployed, recycled, and/or upgraded with ease and flexibility.

FIG. 1A depicts a perspective view of a ballasted support and mounting system 100 consistent with some implementations of the current subject matter. Referring to FIG. 1A, the ballasted support and mounting system 100 can include a base 115, which can be open-topped and hollow. The base 115 can include a rear wall 129 and a front wall 159. In some implementations of the current subject matter, the front wall 159 can be shorter than the rear wall 129, thereby forming a slope along the top of the base 115. The angle of this slope can be configured to position the solar modules attached to the ballasted support and mounting system 100 in an angle that maximizes exposure to solar radiation. It should be appreciated that one or more solar modules can be attached to the ballasted support and mounting system in any orientation including, for example, horizontally and/or vertically.

According to some implementations of the current subject matter, the rear wall 129 and the front wall 159 can be joined by a curved surface that is wrapped under the rear wall 129 and the front wall 159 to form the bottom surface 139 of the base 115. The curvature of the bottom surface 139 can allow the ballasted support and mounting system 100 to be adjusted during installation. Moreover, the curvature of the bottom surface 139 can allow the ballasted support and mounting system 100 to accommodate a wide range of installation surfaces including, for example, rough and/or uneven terrains. As shown in FIG. 1A, the rear wall 129, the front wall 159, and bottom surface 139 can be integrated to form a cavity 150. The cavity 150 can be filled with any type of ballast including, for example, loose dirt, sand, aggregate, cement, blocks, bricks and/or the like. The mass of the ballast can keep the ballasted support and mounting system 100 steady, stable, and in place.

In some implementations of the current subject matter, the ballasted support and mounting system 100 can include a bottom sole 117. As shown in FIG. 1A, the bottom sole 117 can be curved. Furthermore, the bottom sole 117 can include features, such as one or more recesses 123 and/or projections 133, configured to lend additional flexing strength, ground friction, drainage, and stability to the base 115. The dimensions of the recesses 123 and/or the projection 133 can vary depending on the installation site for the ballasted support and mounting system 100. Alternatively and/or additionally, the base 115 can include one or more drainage mechanisms such as, for example, holes, tubes, channels, and/or the like, configured to prevent the accumulation of moisture (e.g., from rain, condensation, and/or the like).

Referring again to FIG. 1A, the top of the base 115 can be bound by an upper support rim 121 and a lower support rim 122. The upper support rim 121 and the lower support rim 122 can be separated by a narrow gap that forms an upper groove 123 and a lower groove 124 on the base 115. The length of the upper grove 123 and/or the lower groove 124 can extend at least partially or fully across the rear wall 129 and/or the front wall 159. One side of the lower support rim 122, for example the side along the rear wall 129, can include one or more holes 130. The holes 130 can be configured to accept one or more stop lugs or pins 105 to ensure the solar modules are held securely in place.

In some implementations of the current subject matter, the support rim 121 can include a flat surface to support the solar module. To allow for heat dispersion, the support rim 121 can include one or more recesses and/or protrusions along its perimeter to at least partially expose the underside of the one or more solar modules attached to the ballasted support and mounting system 100. Alternatively and/or additionally, to provide further support for the solar modules attached to the ballasted support and mounting system 100 the base 115 can include a base top cover (not shown) that extends from the rear wall 129 to the front wall 159 in a longitudinal direction and/or from a left wall to a right wall in a latitudinal direction.

In some implementations of the current subject matter, the recesses 123 and the projections 133 can further create channels configured to accommodate at least one divider 125, which is shown in a non-inserted position. Inserting the divider 125 creates multiple compartments within the cavity 150. It should be appreciated that the base 115 can be configured to accommodate any number of dividers to form any number of compartments within the cavity 150. One or more of these compartments can be filled with varying amounts of ballast. For example, the ballast can be level-filled to different heights within the compartments in the base 115. Here, the rear wall 129, the bottom surface 139, and/or the front wall 159 can include a visible marking (e.g., an indentation, a seam, and/or the like) indicating the required height of the ballast for each compartment. As shown in FIG. 1A, these visible markings can include an upper fill guide 134 and/or a lower fill guide 132. The upper fill guide 134 and/or the lower fill guide 132 can enable an installer to quickly and accurately fill each compartment with different quantities of ballast.

Figure 1B:
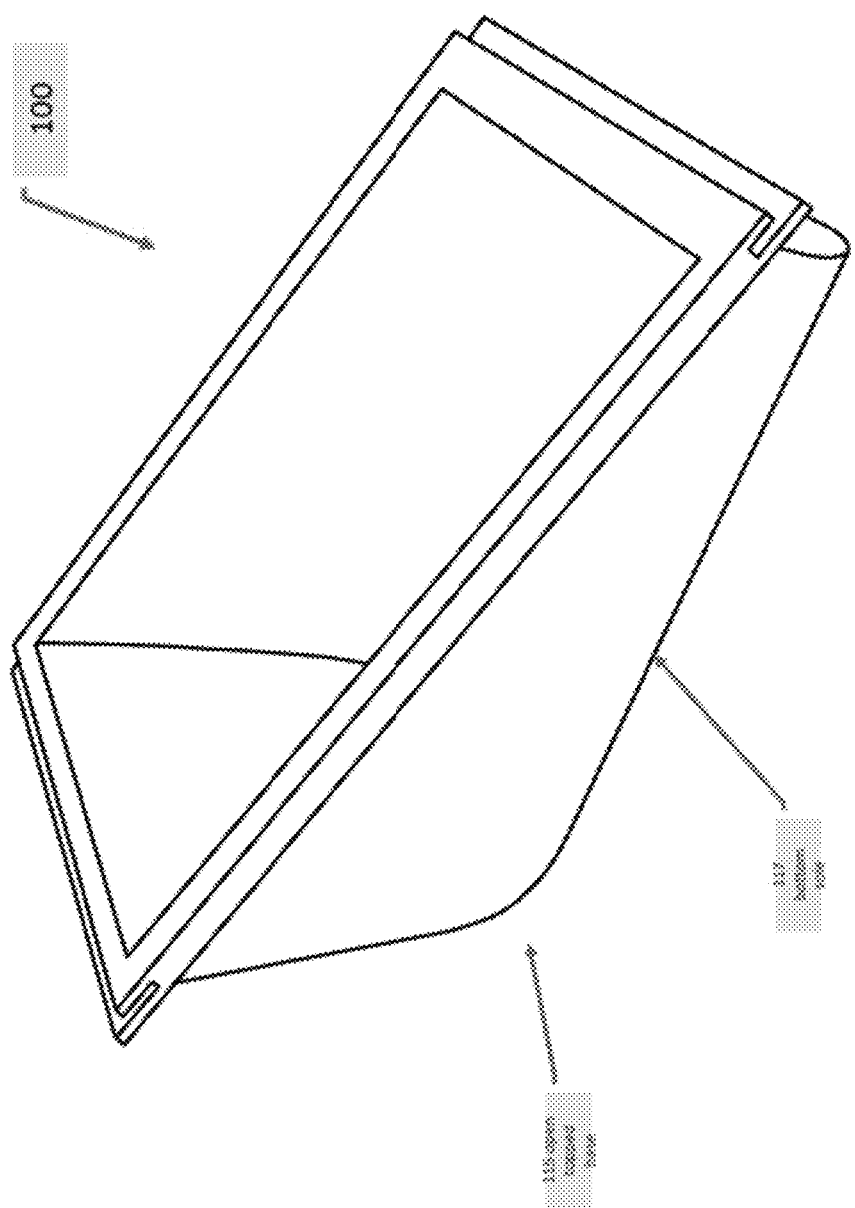
FIG. 1B depicts a perspective view of a ballasted support and mounting system consistent with some implementations of the current subject matter.

FIG. 1B depicts a perspective view of the ballasted support and mounting system 100 consistent with some implementations of the current subject matter. According to some implementations of the current subject matter, the curvature of bottom surface 139 can extend around all sides the base 115. For example, as shown in FIG. 1B, the bottom sole 117 can curve around the front wall 159 and/or the rear wall 129 of the base 115.

Figure 1C:
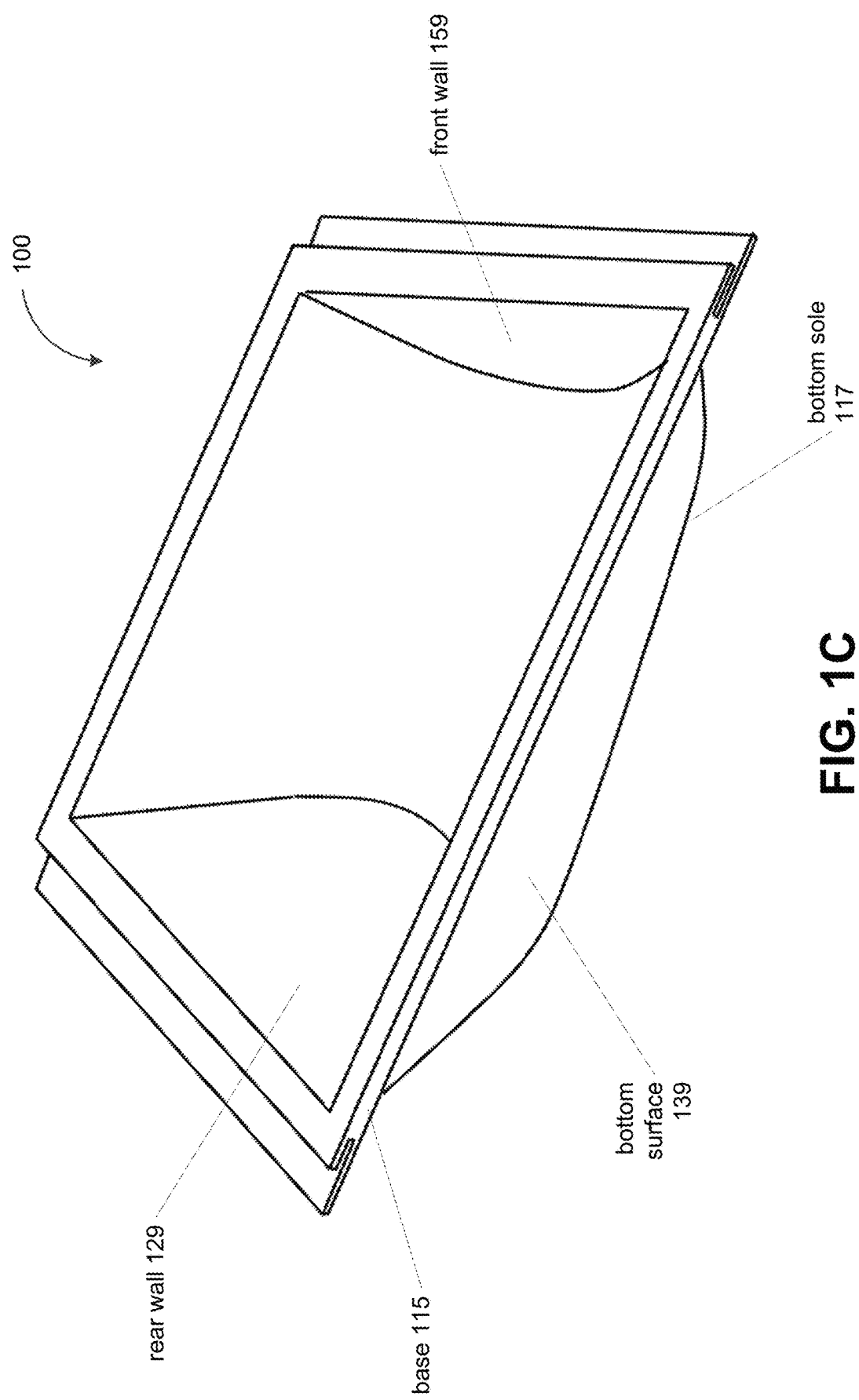
FIG. 1C depicts a perspective view of a ballasted support and mounting system consistent with some implementations of the current subject matter.

FIG. 1C depicts a perspective view of the ballasted support and mounting system 100 consistent with some implementations of the current subject matter. FIG. 1D depicts a front view of the ballasted support and mounting system 100 consistent with some implementations of the current subject matter. As shown in FIG. 1D, the curvature of the bottom surface 139 can have different radii. The radii of the curvature can change between the two ends of the base 115, for example, along an axis that is perpendicular to the rear wall 129 and the front wall 159. To further illustrate, the curvature of the bottom surface 139 can include a first radius $R_1$ at and/or near the rear wall 129 and a second radius $R_2$ at and/or near the front wall 159. The first radius $R_1$ near the rear wall 129 may be greater than or less than the second radius $R_2$ near the front wall 159. In this configuration, the depth of the base 115 can taper from the rear wall 129 to the front wall 159. It should be appreciated that radius of the bottom surface 139 can prevent the ballasted support and mounting system 100 from rolling onto any one side, thereby allowing the ballasted support and mounting system 100 to self-stabilize and remain upright even in the absence of any ballast in the cavity 150.

Figure 1E:
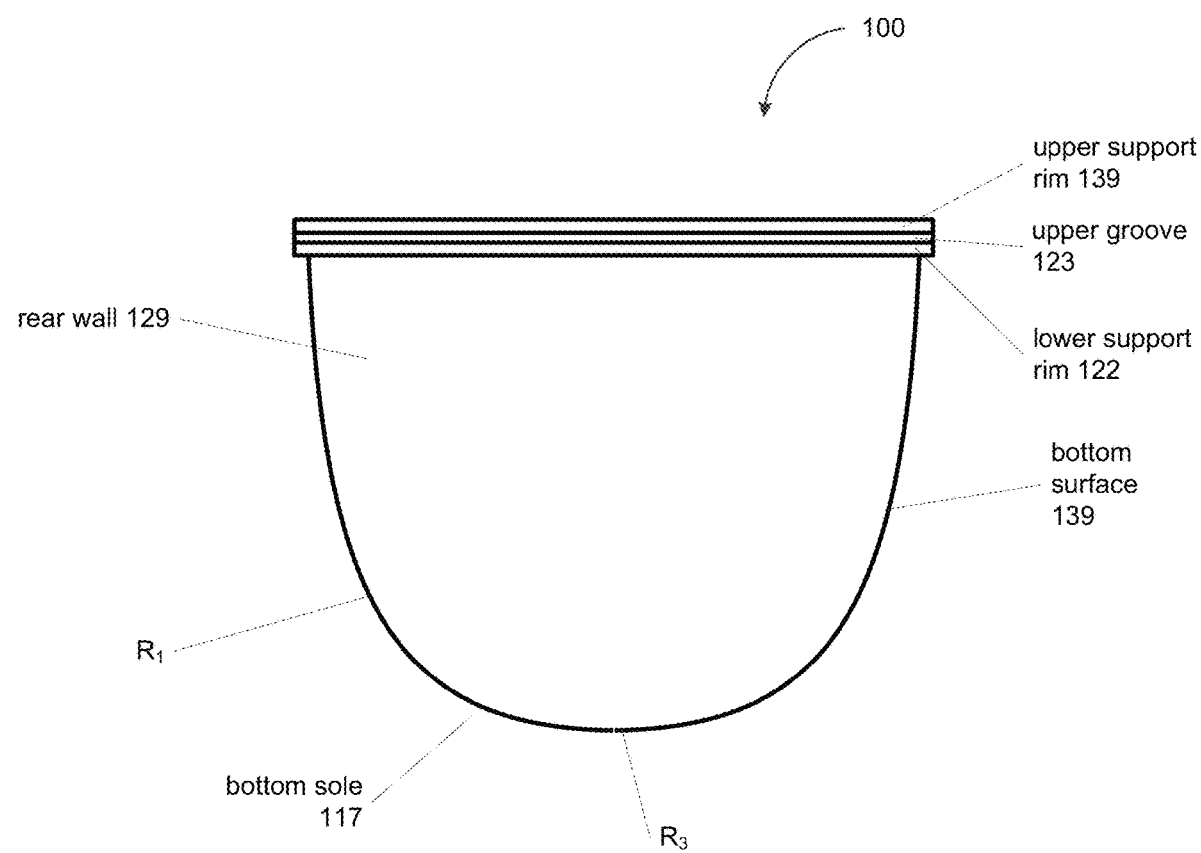
FIG. 1E depicts a rear view of a ballasted support and mounting system consistent with some implementations of the current subject matter.

FIG. 1D depicts a front view of the ballasted support and mounting system 100 consistent with some implementations of the current subject matter. FIG. 1E depicts a rear view of the ballasted support and mounting system 100 consistent with some implementations of the current subject matter. In some implementations of the current subject matter, the radii of the curvature of the bottom surface 139 can also change between the two sides of the base 115, for example, along an axis that is parallel to both the rear wall 129 and the front wall 159. For instance, as shown in FIG. 1E, the curvature of the bottom surface 139 along the rear wall 129 can include the first radius $R_1$ and a third radius $R_3$ (not shown). As such, the curvature of the bottom surface 139 may have one radius (e.g., the first radius $R_1$) along the sides of the rear wall 129 and a different radius (e.g., the third radius $R_3$) along the bottom of the rear wall 129. The third radius $R_3$ can be greater than or less than the first radius $R_1$.

The rear wall 129 can have a different (e.g., greater) radius than the front wall 159, thereby creating a curvature of bottom surface 139 that has different radii at different points between the rear wall 129 and the front wall 159. This difference in radii (e.g., between the front wall 159 and the rear wall 129) provides flexibility when aligning a solar module and the base 115 during initial assembly. Furthermore, the different in radii provides stability during installation as well as operation. As shown in FIG. 1D, front wall 159 can include a different and varying dimension radius than rear wall 129, and rear wall 129 can include a varying radius that can provide shaped sections 812, 814 that form the sole 117.

Figure 1F:
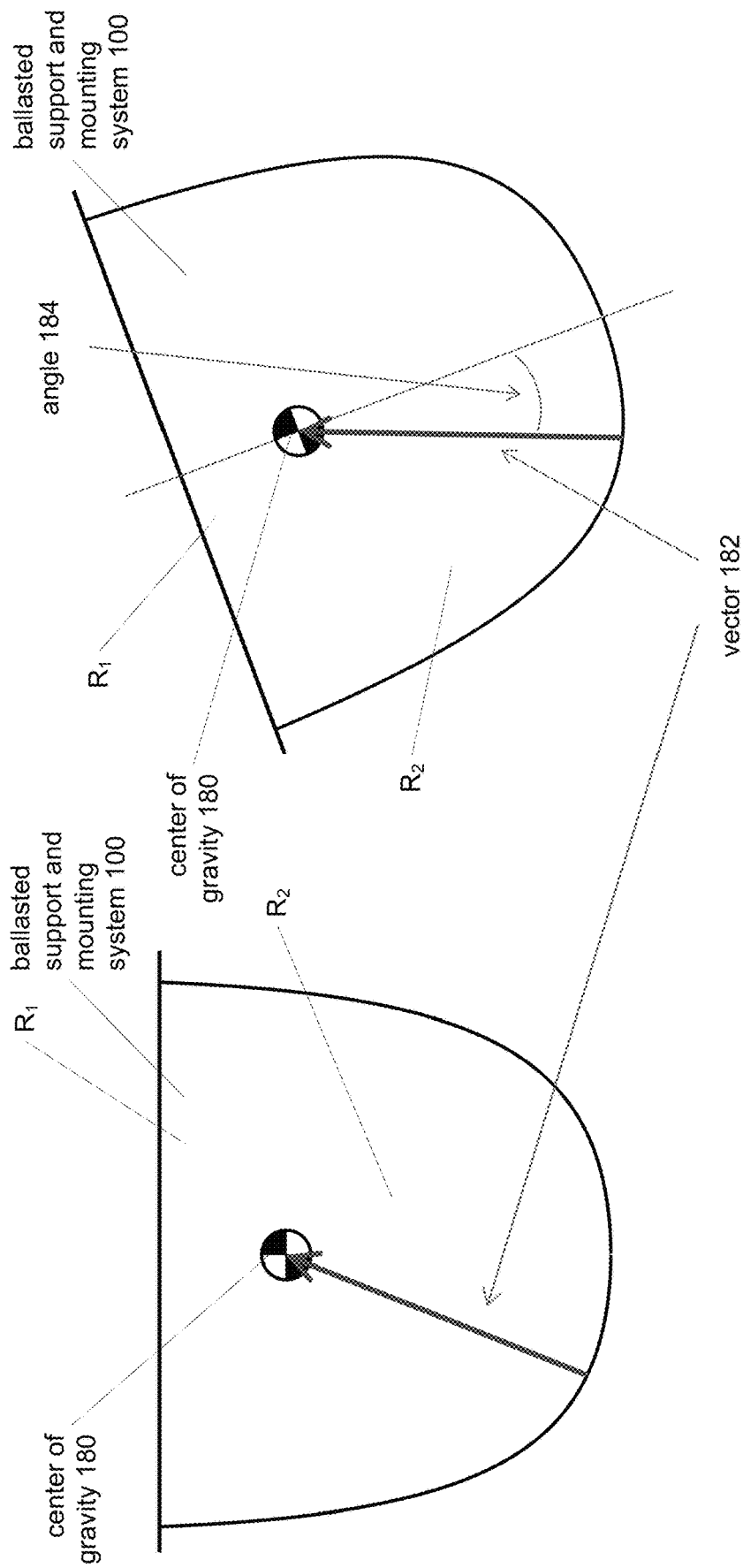
FIG. 1F depicts the self-stabilization of a ballasted support and mounting system consistent with some implementations of the current subject matter.

FIG. 1F depicts the self-stabilization feature of the ballasted support and mounting system 100 consistent with some implementations of the current subject matter. As shown in FIG. 1D, the first radius $R_1$ near the rear wall 129 can be greater than the second radius $R_2$ near the front wall 159 of the ballasted support and mounting system 100. Alternatively, the second radius $R_2$ can be greater than the first radius $R_1$. Referring to FIG. 1F, the ballasted support and mounting system 100 may be destabilized and tipped towards one side. Here, the gravitational force against the ballasted support and mounting system 100 can return the ballasted support and mounting system 100 to an upright position up until when a vector 182 between the center-of-gravity 180 of the filled container and the center of the second radius $R_2$ has rotated past vertical. The angle 184 indicates an angle of rotation within which the ballasted support and mounting system 100 is able to self-stabilize.

Figure 1G:
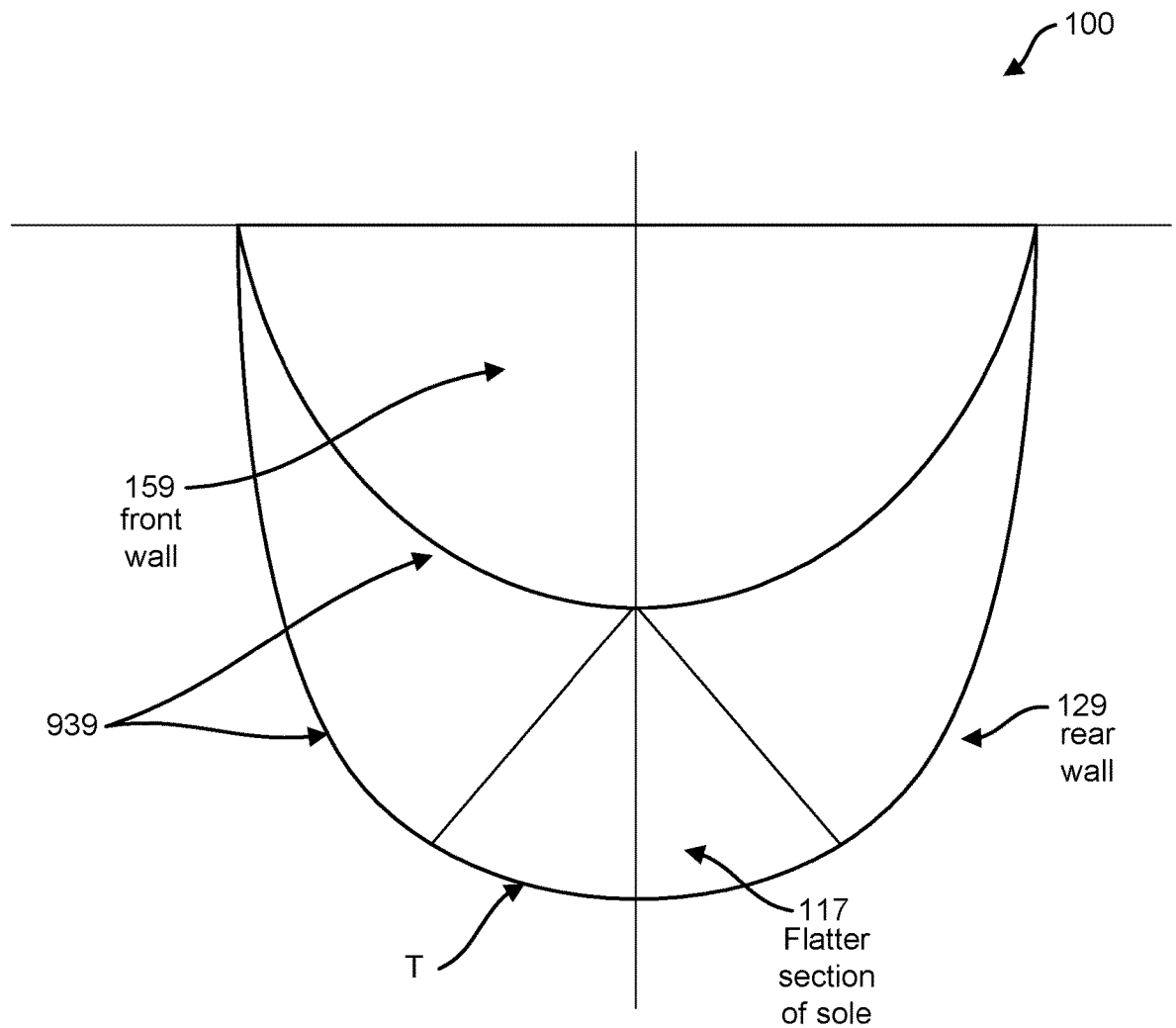
FIG. 1G depicts a bottom view of a ballasted support and mounting system consistent with some implementations of the current subject matter.

FIG. 1G depicts a bottom view of the ballasted support and mounting system 100 consistent with some implementations of the current subject matter. As shown in FIG. 1G, the shape of the sole 117 can vary due to the difference in radii between the front wall 159 and the rear wall 129. This difference in radii of a curved section 939 can create a triangular section T of the sole that is flatter than adjacent areas 117.

Figure 2A:
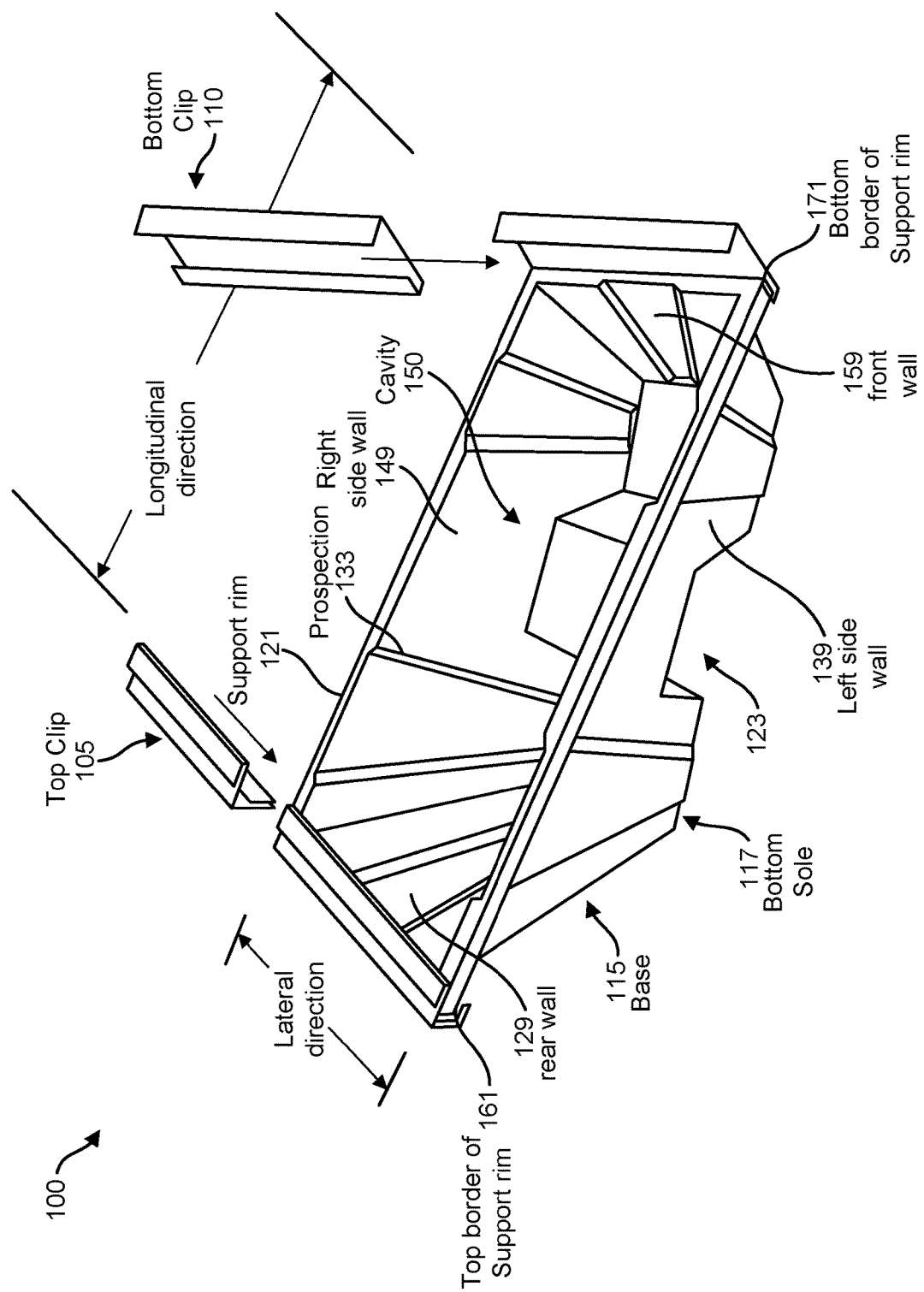
FIG. 2A depicts a clip-based attachment system consistent with some implementations of the current subject matter.
Figure 2B:
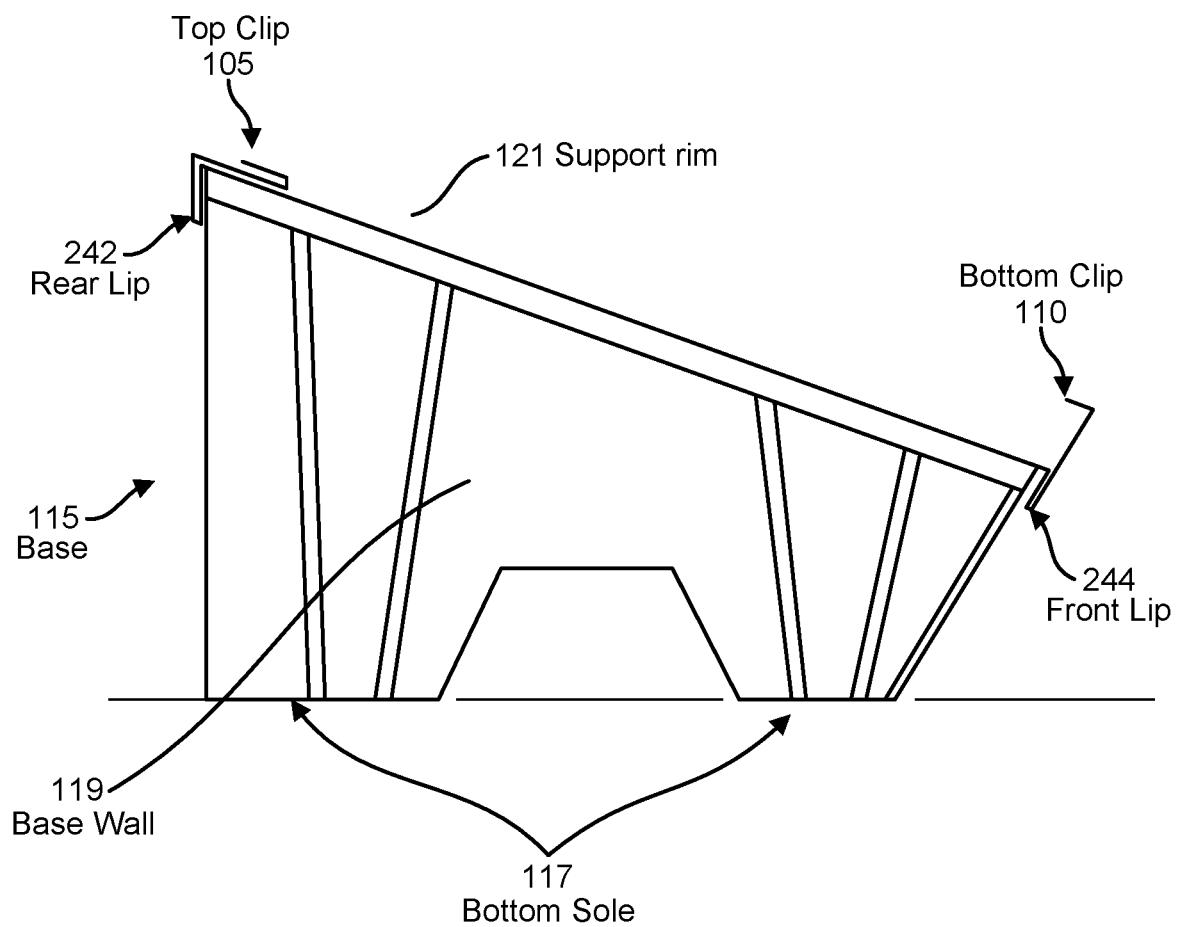
FIG. 2B depicts a clip-based attachment system consistent with some implementations of the current subject matter.

FIG. 2A-B depict a clip-based attachment system 140 consistent with some implementations of the current subject matter. Referring to FIGS. 1A and 2A, the clip-based attachment system 140 can include a top clip 105 and a bottom clip 110. The support rim 121 can include a rear lip flange 242 along a top border 161 of the support rim 121 and a front lip flange 244 along a bottom border 171 of the support rim 121. The rear lip flange 242 can be configured to receive the top clip 105 while the front lip flange 244 can be configured to receive the bottom clip 110. It should be appreciated that the top clip 105 and/or the bottom clip 110 can be molded to be an integral part of the base 115. Alternatively and/or additionally, the top clip 105 and/or the bottom clip 110 can be separate and/or detachable components of the ballasted mounting and support system 100. In either case, the top clip 105 and the bottom clip 110 can be configured to receive and secure one or more solar modules onto the base 115.

Figure 3A:
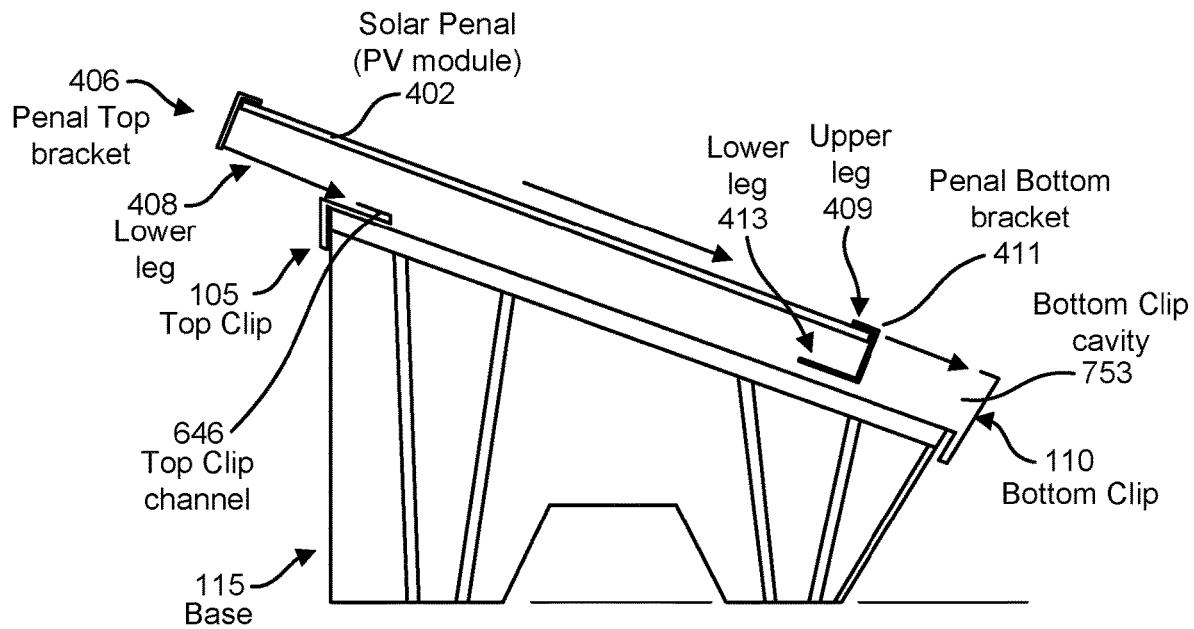
FIG. 3A depicts an installation of a solar module via a clip-based attachment system consistent with some implementations of the current subject matter.

FIG. 3A depicts the mounting of a solar module 402 via the clip-based attachment system 140 consistent with some implementations of the current subject matter. In some implementations of the current subject matter, the solar module 402 can include a metal frame that includes a panel top bracket 406 and a panel bottom bracket 411. However, it should be appreciated that the clip-based attachment system 140 can also be configured to secure one or more frameless solar modules to the base 115 of the ballasted mounting and support system 100.

As shown in FIG. 3A, the panel top bracket 406 can include an upper leg 404 that is affixed to a top surface of the solar module 402 and a lower leg 408 that extends beneath a bottom surface of the solar module 402. Similarly, the panel bottom bracket 411 can include an upper leg 409 that is affixed to the top surface of the solar module 402 and a lower leg 413 that extends beneath the bottom surface of the solar module 402. The solar module 402 can be attached to the base 115 of the ballasted support and mounting system 110 by sliding the lower leg 408 of the top bracket 406 into the top clip 105. Meanwhile, the panel bottom bracket 409 can be slid into the bottom clip 110.

Figure 3B:
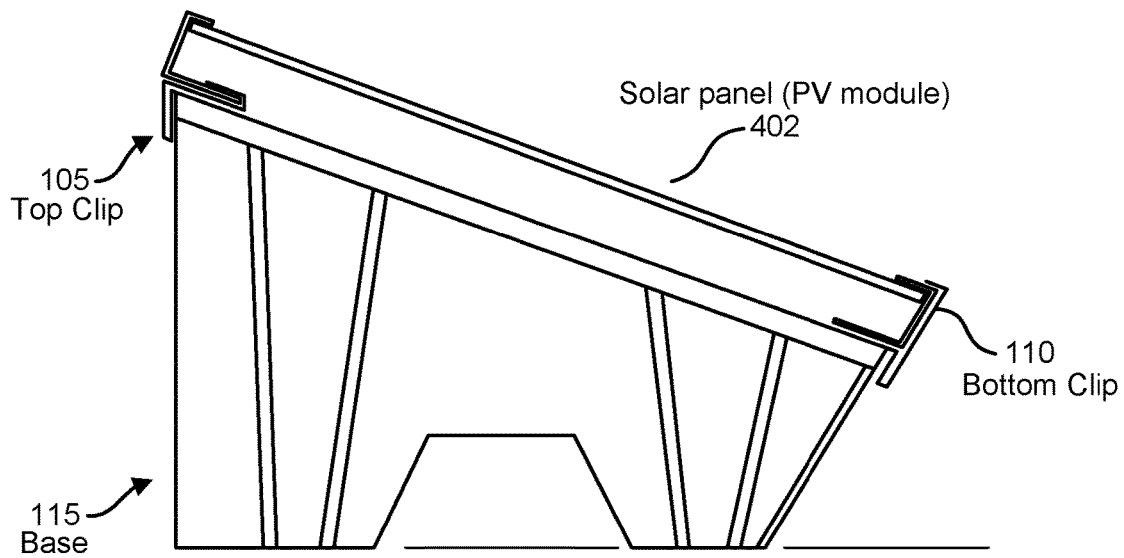
FIG. 3B depicts a side view of a solar module installed via a clip-based attachment system consistent with some implementations of the current subject matter.

In some implementations of the current subject matter, the solar module 402 can be attached to the base 115 by sliding the solar module 402 downward along the slope of the supporting rim 121 into top clip 105 and bottom clip 110. As the solar module 402 slid into the top clip 105 and the bottom clip 110, the upper leg 404 of the panel top bracket 406 is received by a top clip channel 646 while the panel bottom bracket 411 is received by a bottom clip cavity 753, thereby clamping the solar module 402 onto base 115. FIG. 3B depicts a side view of the solar module 402 installed via the clip-based attachment system 140 consistent with some implementations of the current subject matter. It should be appreciated that the top clip 105 and the bottom clip 110 can be dimensioned and manufactured to be installed and secured to the base 115 without the use of any special installation tools and/or personnel. The use of the top clip 105 and the bottom clip 110 can further obviate the need for threaded fasteners in attaching the solar module 402 to the ballasted mounting and support system 100.

Figure 3C:
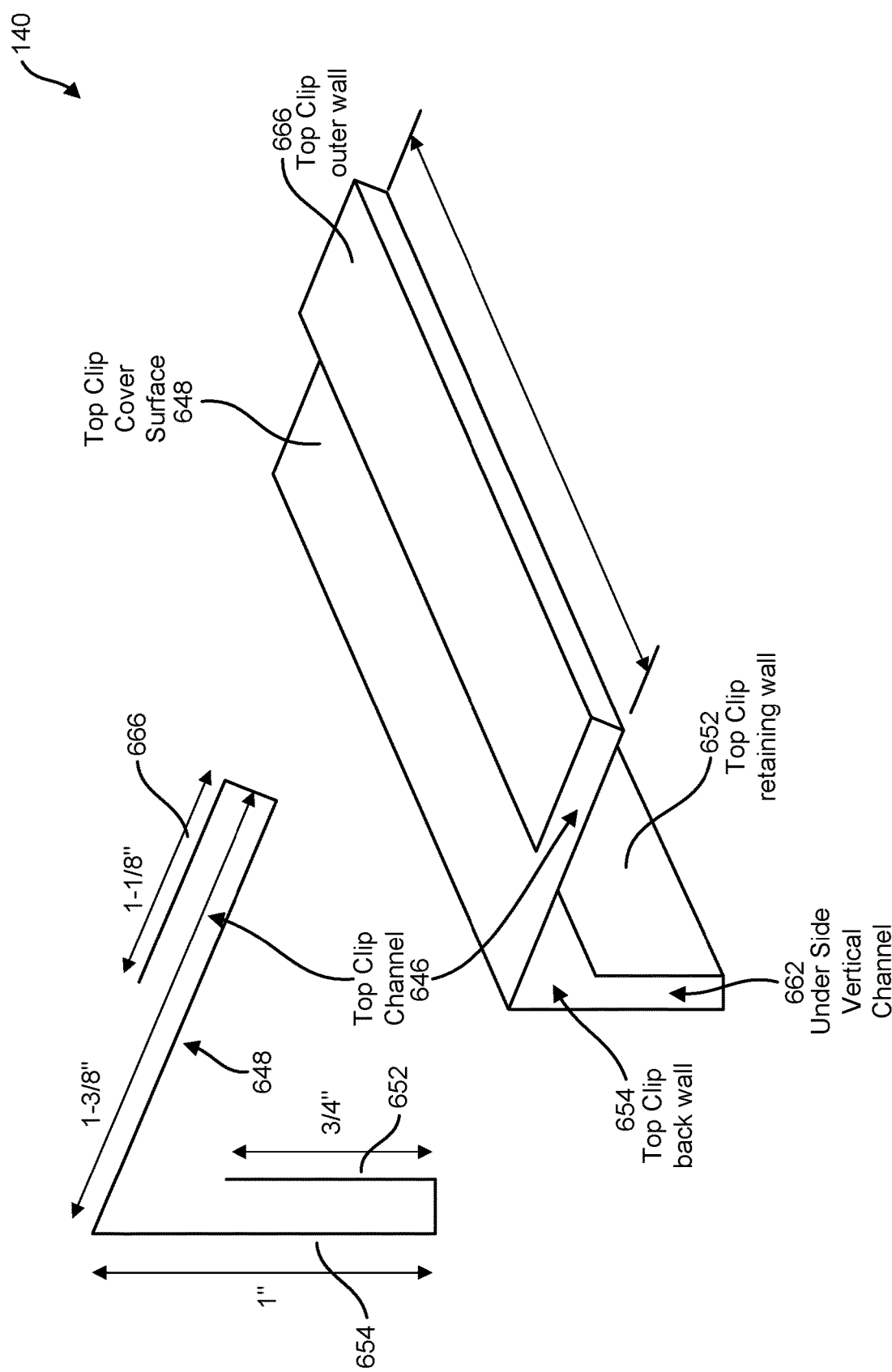
FIG. 3C depicts a clip-based attachment system consistent with some implementations of the current subject matter.
Figure 3D:
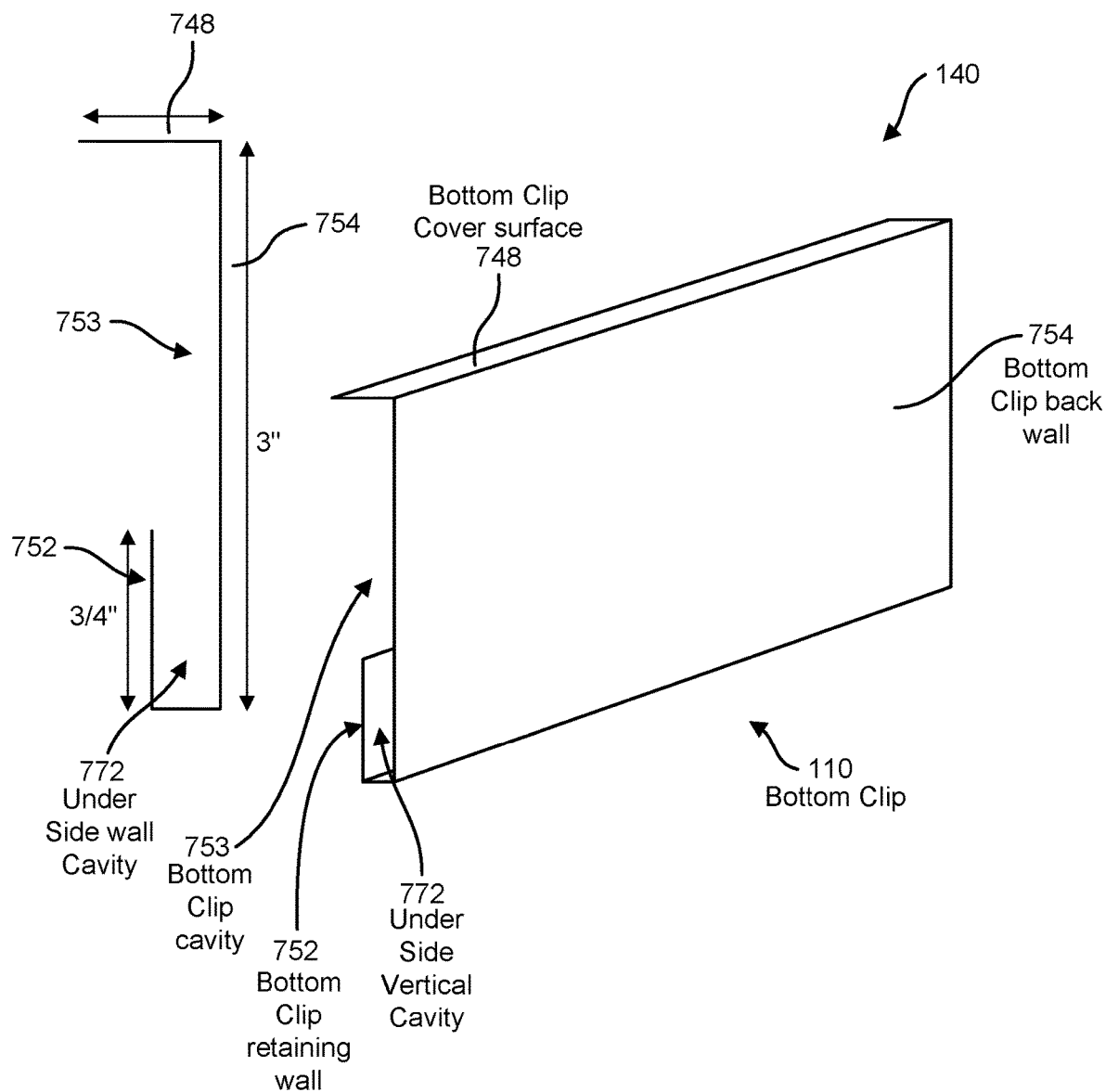
FIG. 3D depicts a clip-based attachment system consistent with some implementations of the current subject matter.
Figure 3E:
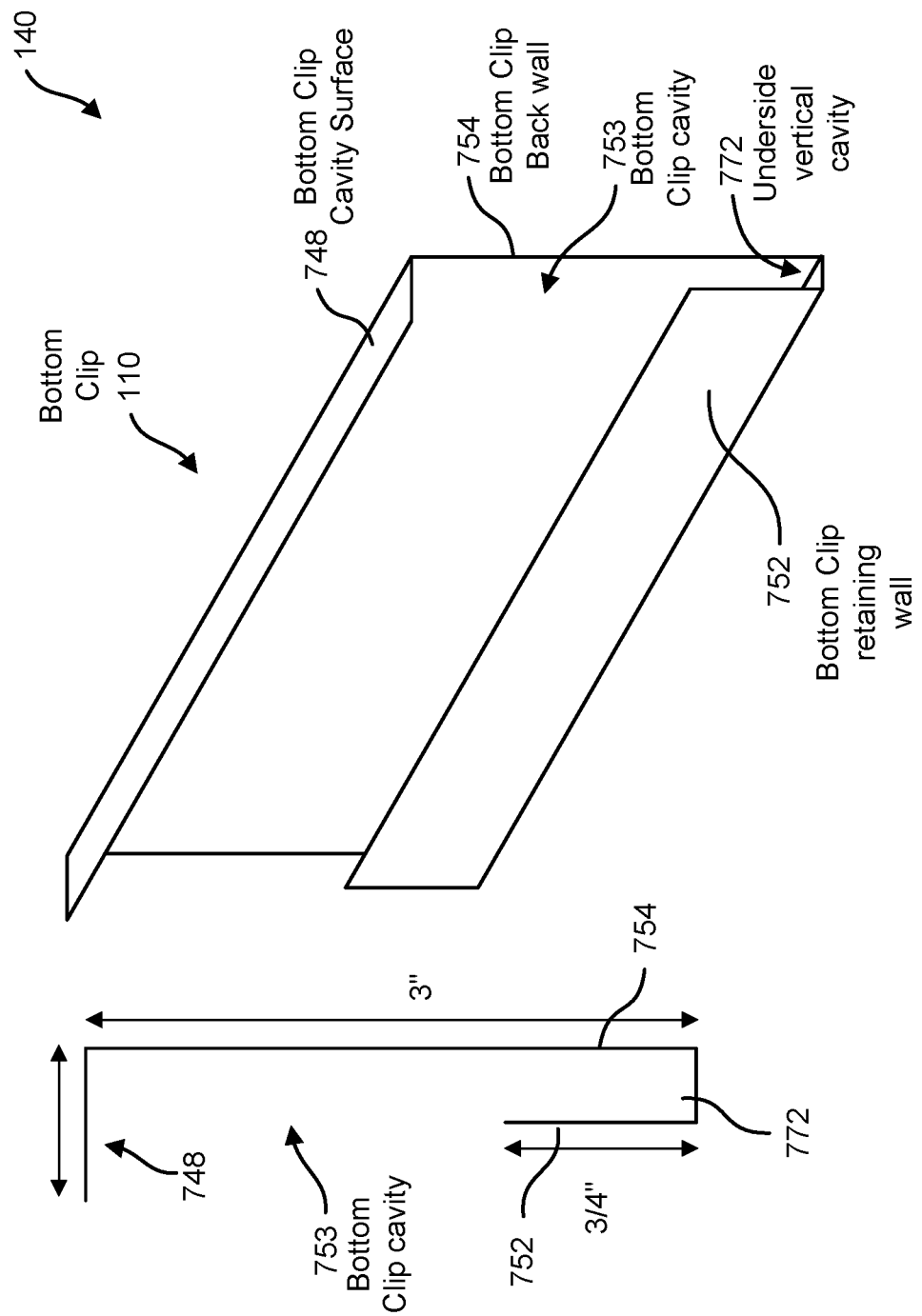
FIG. 3E depicts a clip-based attachment system consistent with some implementations of the current subject matter.

FIG. 3C-E depict the clip-based attachment system 140 consistent with some implementations of the current subject matter. As shown in FIG. 3C, the top clip 105 can include a top clip retaining wall 652 on the underside of the top clip 105. The top clip retaining wall 652 can extend downward and form an underside vertical channel 662 with a top clip back wall 654. Meanwhile, the top clip back wall 654 can extend upward from the underside vertical channel 662. Furthermore, the top clip back wall 654 can be bent to form substantially the same angle as the angle that is formed where the rear wall 129 meets the top border 161 of the support rim 121 (e.g., 70 degrees), thereby forming a top clip cover surface 648. In this fashion, the top clip cover surface 648 can rest along the top border 161 of then support rim 121 when the top clip 105 is installed. The top clip cover surface 648 can extend longitudinally and can be bent to fold back over as an outer wall 666, thereby forming the top clip channel 646. As noted, the top clip channel 646 can be configured receive the upper leg 404 of the panel top bracket 406. Alternatively and/or additionally, the top clip channel 646 can include a cushion element formed from, for example, rubber, urethane, silicone, and/or the like, to absorb and/or distribute the clamping pressure exerted against the solar module 402 by the top clip 105 along the top clip cover surface 648.

Referring to FIGS. 3D-E, the bottom clip 110 can include a bottom clip retaining wall 752 on the underside of the bottom clip 110. The bottom clip retaining wall 752 can extend downward and form an underside vertical cavity 772 along with a bottom clip back wall 754. The bottom clip back wall 754 can extend upward from the underside vertical cavity 772. The bottom clip back wall 754 can be formed at substantially the same angle as the angle that is formed where the front wall 159 meets the bottom border 171 of the support rim 121, thereby forming a bottom clip cover surface 748. In this fashion, the bottom clip cover surface 748 can be substantially parallel to the bottom border 171 of the support rim 121 when bottom clip 110 is installed on the base 115. The bottom clip cover surface 748 can extend longitudinally to form the bottom clip cavity 753. As noted, the bottom clip cavity 752 can be configured to receive the panel bottom bracket 411 of the solar module 402. Here, the underside vertical cavity 772 can provide a clamping force on the solar module 402 when the solar module 402 is slid into the bottom clip 110. Moreover, the bottom clip cavity 753 can include a cushion element formed from for example, rubber, urethan, silicone, and/or the like, to absorb and/or distribute the clamping pressure exerted against the solar module 402 by the bottom clip 110 along the bottom clip cover surface 748.

Referring again to FIG. 2A, the top clip 105 can be attached to the base 115 by sliding the top clip 105 laterally across the top border 161 of the support rim 121. Alternatively and/or additionally, the bottom clip 110 can be attached to the base 115 by sliding the bottom clip 110 laterally across the bottom border 171 of the support rim 121. In doing so, the underside vertical channel 662 of top clip 105 can engage with the rear lip flange 242 of the base 115 while the underside vertical cavity 772 of bottom clip 110 can engage with the front lip flange 244 of the base 115. Here, the top clip retaining wall 652 can be dimensioned and manufactured to apply pressure against the rear lip flange 242, thereby securing the top clip 105 onto the base 115. Likewise, the bottom clip retaining wall 752 can be dimensioned and manufactured to apply pressure against the front lip flange 244, thereby securing the bottom clip 110 onto the base 115.

Figure 3F:
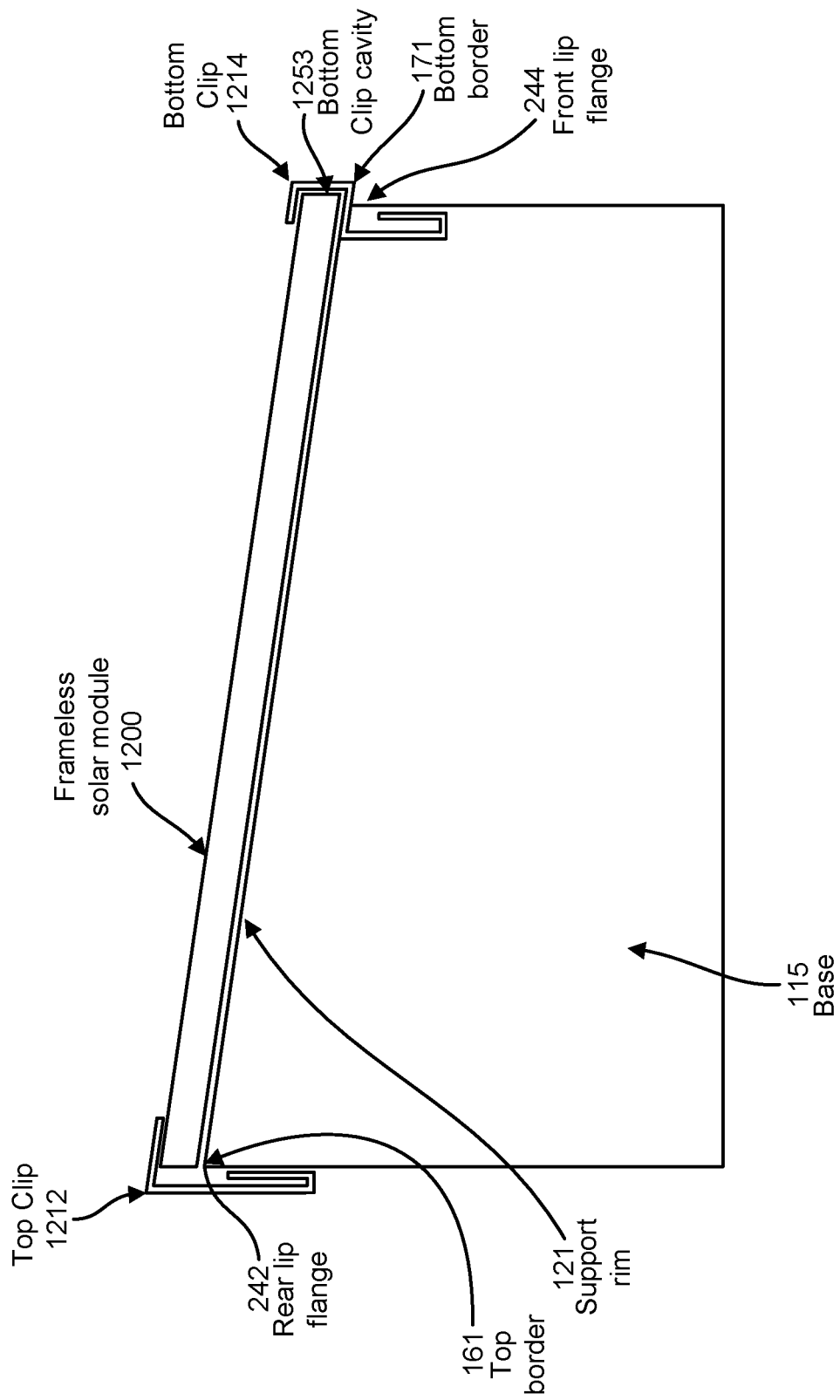
FIG. 3F depicts a side view of a frameless solar module installed via a clip-based attachment system consistent with some implementations of the current subject matter.

FIG. 3F depicts a side view of a frameless solar module 1200 installed via a clip-based attachment system 1210 consistent with some implementations of the current subject matter. The clip-based attachment system 1210, which can include the top clip 1212 and the bottom clip 1214, can be configured to attach the frameless solar module 1200 to the base 151 of the ballasted mounting and support system 100. As shown in FIG. 3F, the bottom border 171 of the support rim 1221 can include the front lip flange 1244, which extends into the cavity of the base 115. The bottom clip 1214 can be inserted vertically into front lip flange 1244. Meanwhile, the frameless solar module 1200 can be placed on the support rim 1221 and slid down so that the solar module 1200 rests in a bottom clip cavity 1253 of the bottom clip 1214. The top clip 1210 can subsequently be slid over the rear lip flange 242 of the top border 161 of the support rim 121, thereby securing the frameless solar module 1200 to the base 151.

Figure 3G:
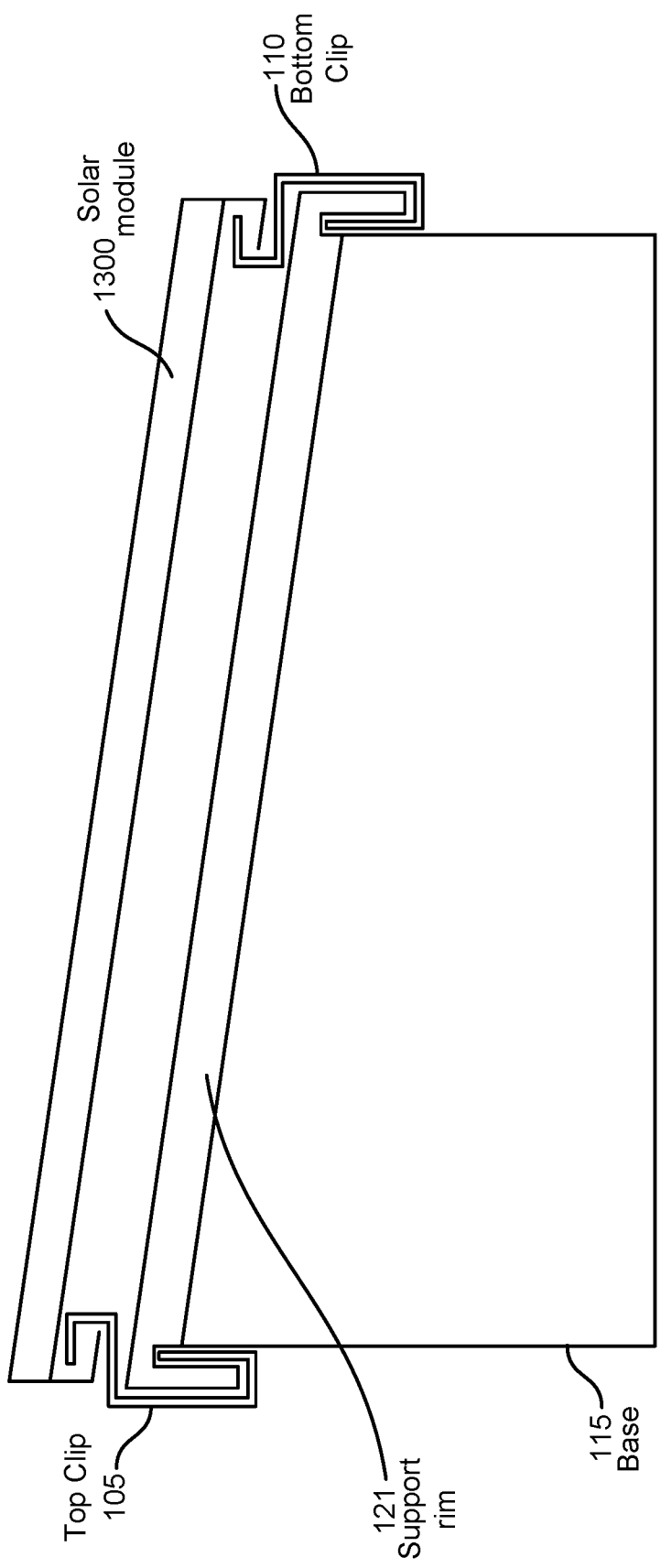
FIG. 3G depicts a side view of a frameless solar module installed via a clip-based attachment system consistent with some implementations of the current subject matter.

FIG. 3G depicts a side view of a solar module 1300 installed via the clip-based attachment system 140 consistent with some implementations of the current subject matter. As shown in FIG. 3G, the dimensions of the top clip 105 and/or the bottom clip 110 can be modified in order to accommodate the solar module 1300, whether the solar module 1300 is framed and/or frameless. Alternatively and/or additionally, the top clip 105 and/or the bottom clip 110 can be attached to different locations along the support rim 121 in order to accommodate the solar module 1300 in various orientations (e.g., horizontal and/or vertical).

Figure 3H:
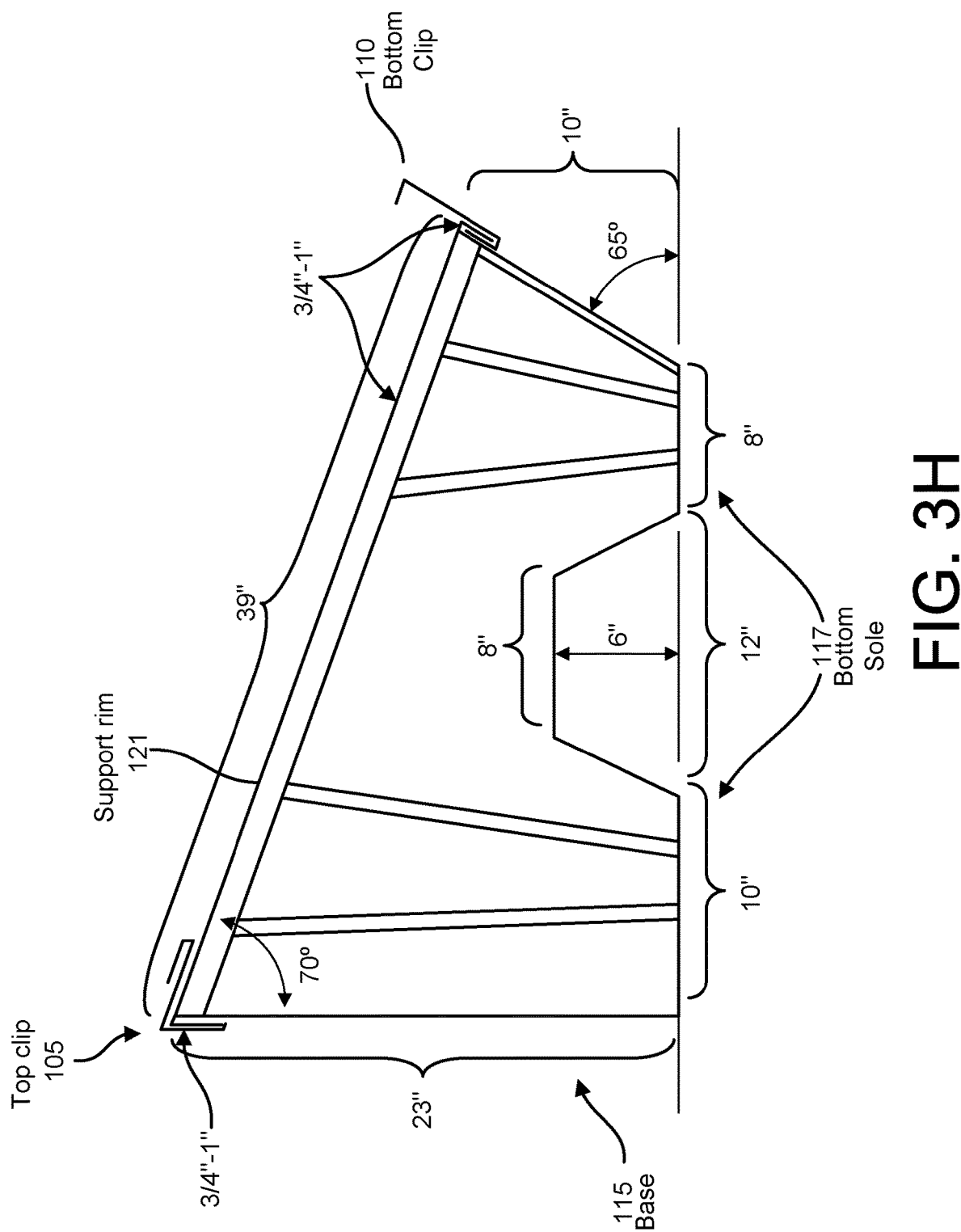
FIG. 3H depicts a side view of a clip-based attachment system consistent with some implementations of the current subject matter.

FIG. 3H depicts a side view of the clip-based attachment system 140 consistent with some implementations of the current subject matter. Here, FIG. 3H shows some example dimensions for the top clip 105, the bottom clip 110, and the ballasted mounting and support system 100.

Figure 4A:
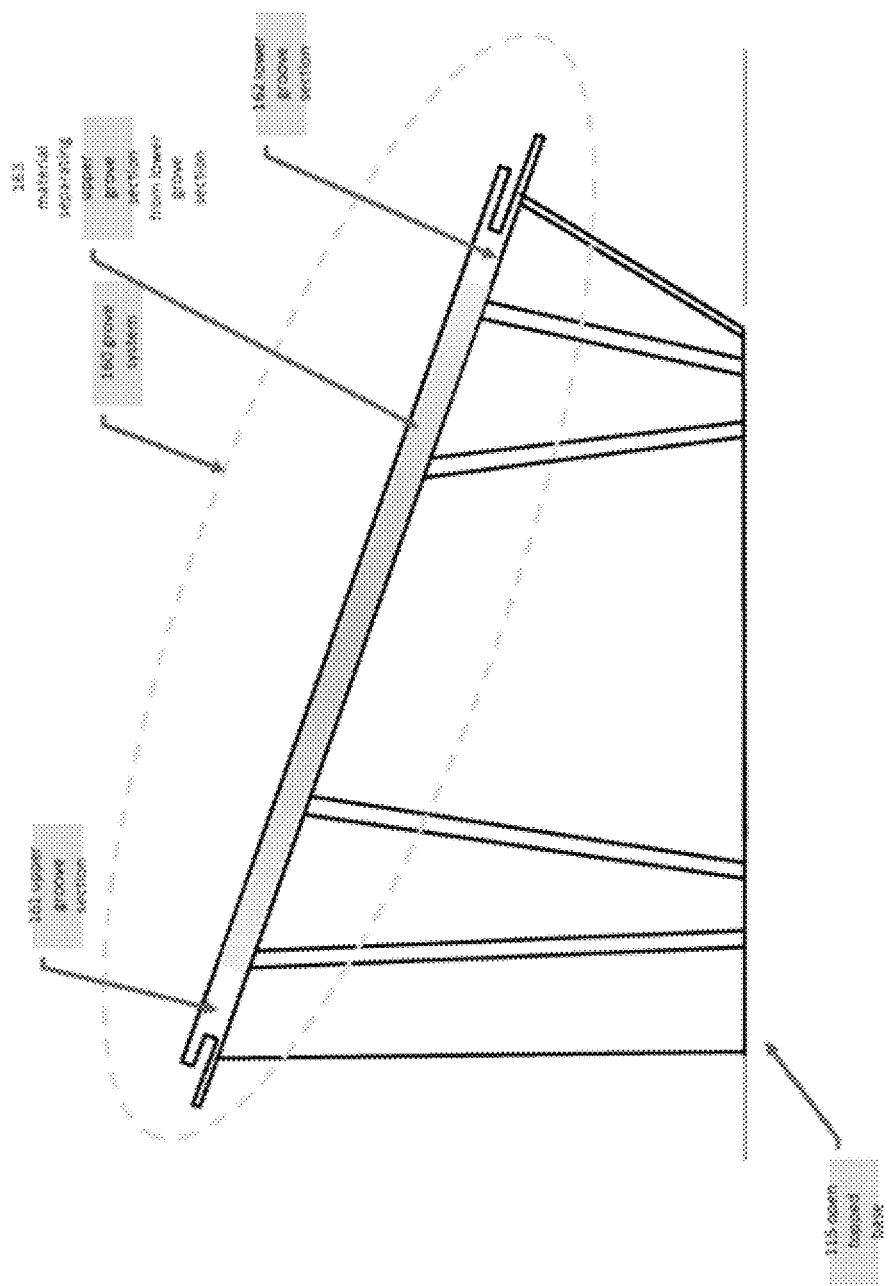
FIG. 4A depicts a groove-based attachment system consistent with some implementations of the current subject matter.

FIG. 4A depicts a groove-based attachment system 160 consistent with implementations of the current subject matter. Referring to FIGS. 1A and 4A, the groove-based attachment system 160 can be integrated into the base 115 of the ballasted support and mounting system 100. For example, the groove-based attachment system 160 can be molded as part of the base 115 and/or attached as a separate component. As shown in FIG. 2A, the groove-based attachment system 160 can include an upper groove section 161 and a lower groove section 162. A length of the grove-based attachment system 150 for example, the distance separating the upper groove section 161 and the lower groove section 162, can be variable. For instance, this length may vary depending on the dimensions of the solar modules being mounted onto the ballasted support and mounting system 100.

Figure 4B:
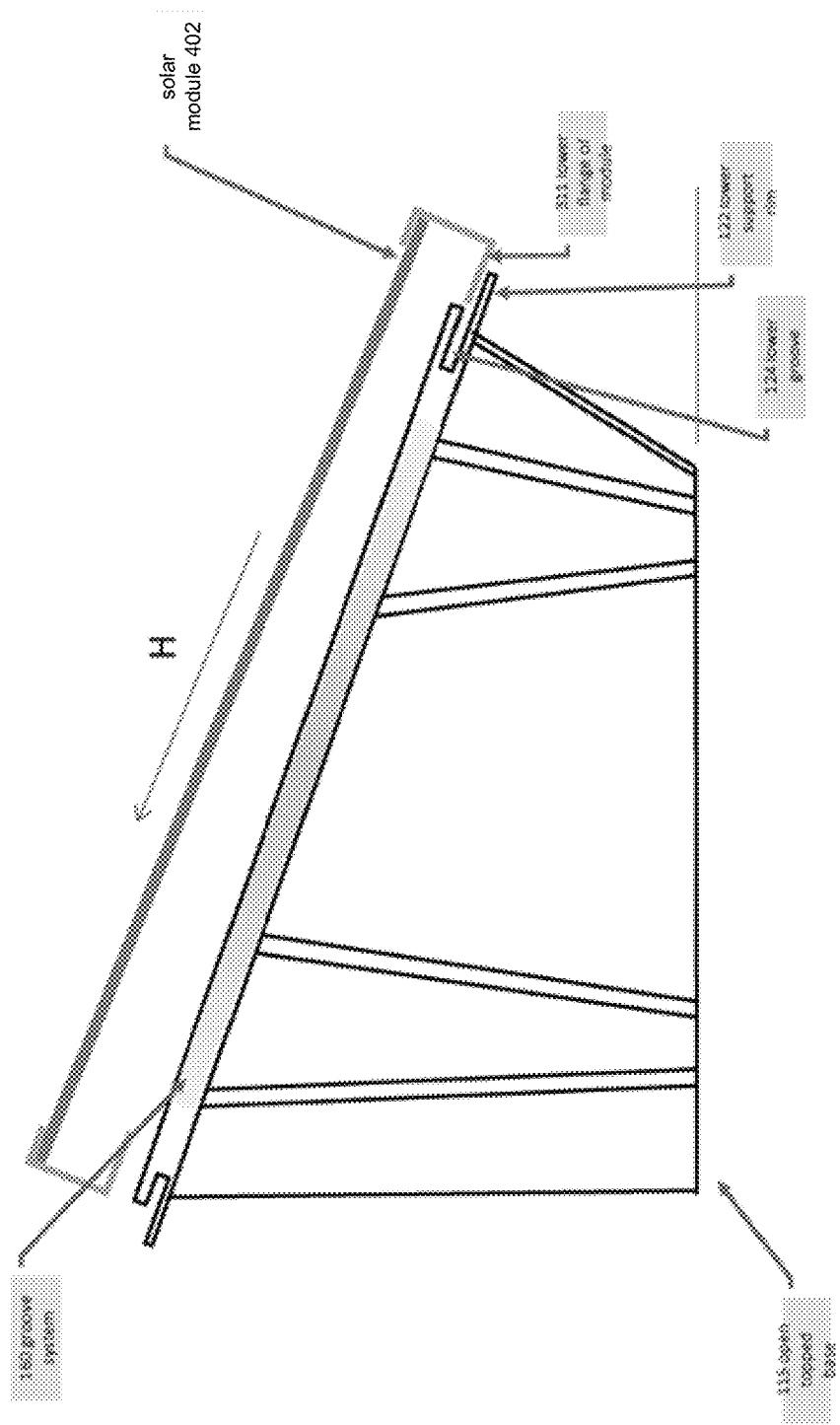
FIG. 4B depicts an installation of a solar panel via a groove-based attachment system consistent with some implementations of the current subject matter.

FIG. 4B depicts an installation of the solar panel 402 via the groove-based attachment system 160 consistent with some implementations of the current subject matter. As shown in FIG. 4B, a lower frame flange 311 of the solar module 402 can be placed on the lower support rim 122 along the front wall 159 of the base 115. The solar module 402 can subsequently be pulled towards the rear wall 159 of the base 115, as shown by the directional arrow H, thereby engaging the lower frame flange 311 into the lower groove 124.

FIG. 4C depicts an installation of the solar panel 402 via the groove-based attachment system 160 consistent with some implementations of the current subject matter. As shown in FIG. 4C, the depth of the lower groove 124 can be configured to allow an upper frame flange 410 of the solar module 402 to extend over the upper groove section 161. Subsequent to pulling the solar module 402 towards the rear wall 159 as shown in FIG. 4C, the upper frame flange 410 can then be lowered along the directional arrow L such that the upper frame flange 410 rests on the lower support rim 122 along the rear wall 129 of the base 115.

FIG. 4D depicts an installation of the solar panel 402 via the groove-based attachment system 160 consistent with some implementations of the current subject matter. By lowering the upper flange 410 of the solar module 402 along the directional arrow L as shown in FIG. 4C, the upper frame flange 410 of the solar module 402 can come to rest on the lower support rim 122 along the rear wall 129 of the base 115. The solar module 402 can subsequently be slid toward the front wall 159 in the direction of the downward arrow D.

Figure 4E:
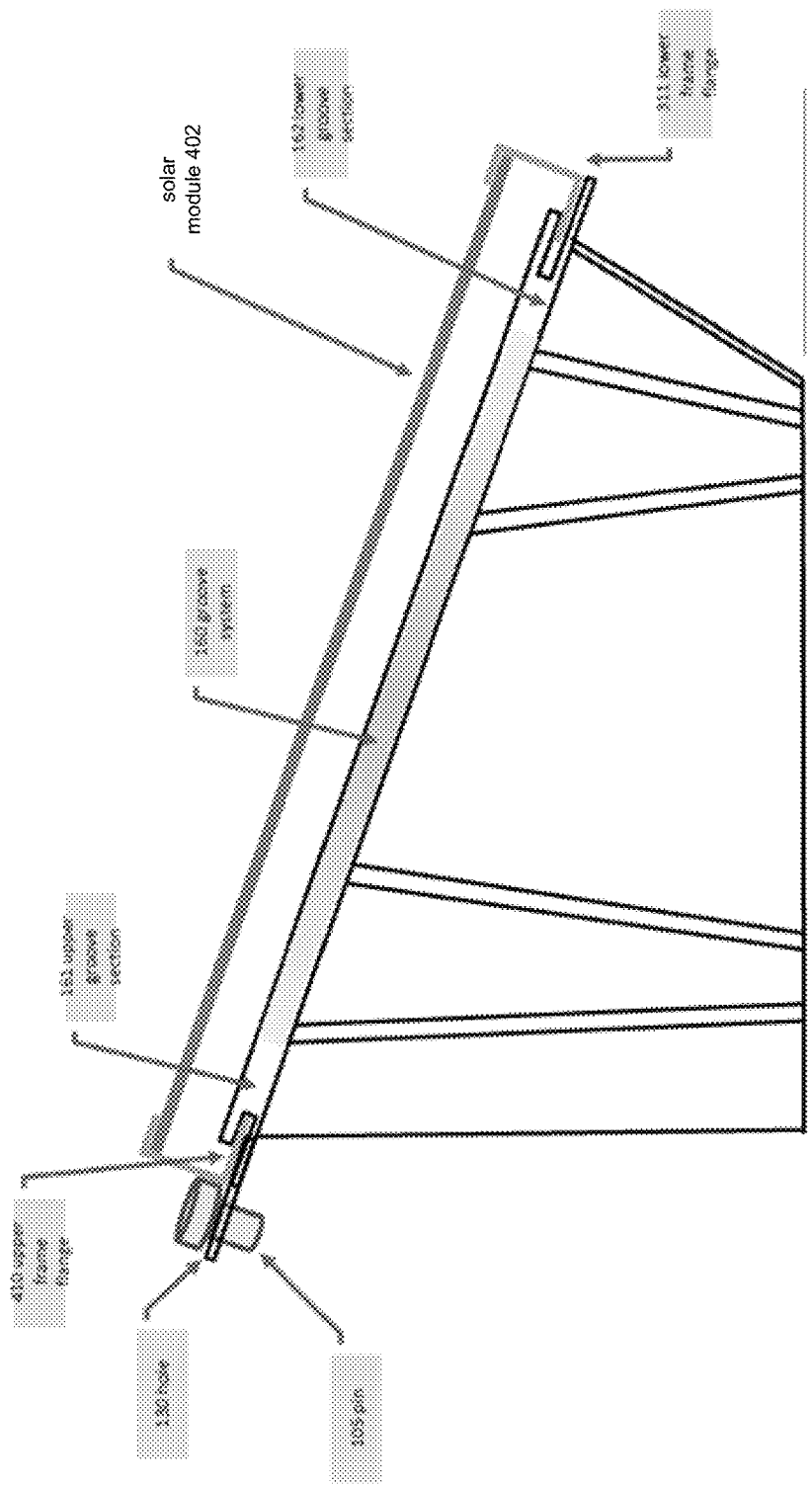
FIG. 4E depicts a side view of a solar panel installed via a groove-based attachment system consistent with some implementations of the current subject matter.

FIG. 4E depicts a side view of the solar panel 402 installed via the groove-based attachment system 160 consistent with some implementations of the current subject matter. As shown in FIG. 4E, in some implementations of the current subject matter, the upper frame flange 410 can partially or fully engage the upper groove section 161 and/or the lower frame flange 311 can partially or fully engage the lower groove section 162, when the solar module 402 is in place. Here, one or more stop lugs or pins 105 can be inserted into the holes 130 to ensure that the solar module 402 is properly inserted into the groove system 160 as well as to prevent the 402 from vibrating and/or shifting toward the rear wall 129, for example, due to wind and/or ground movements.

Figure 4F:
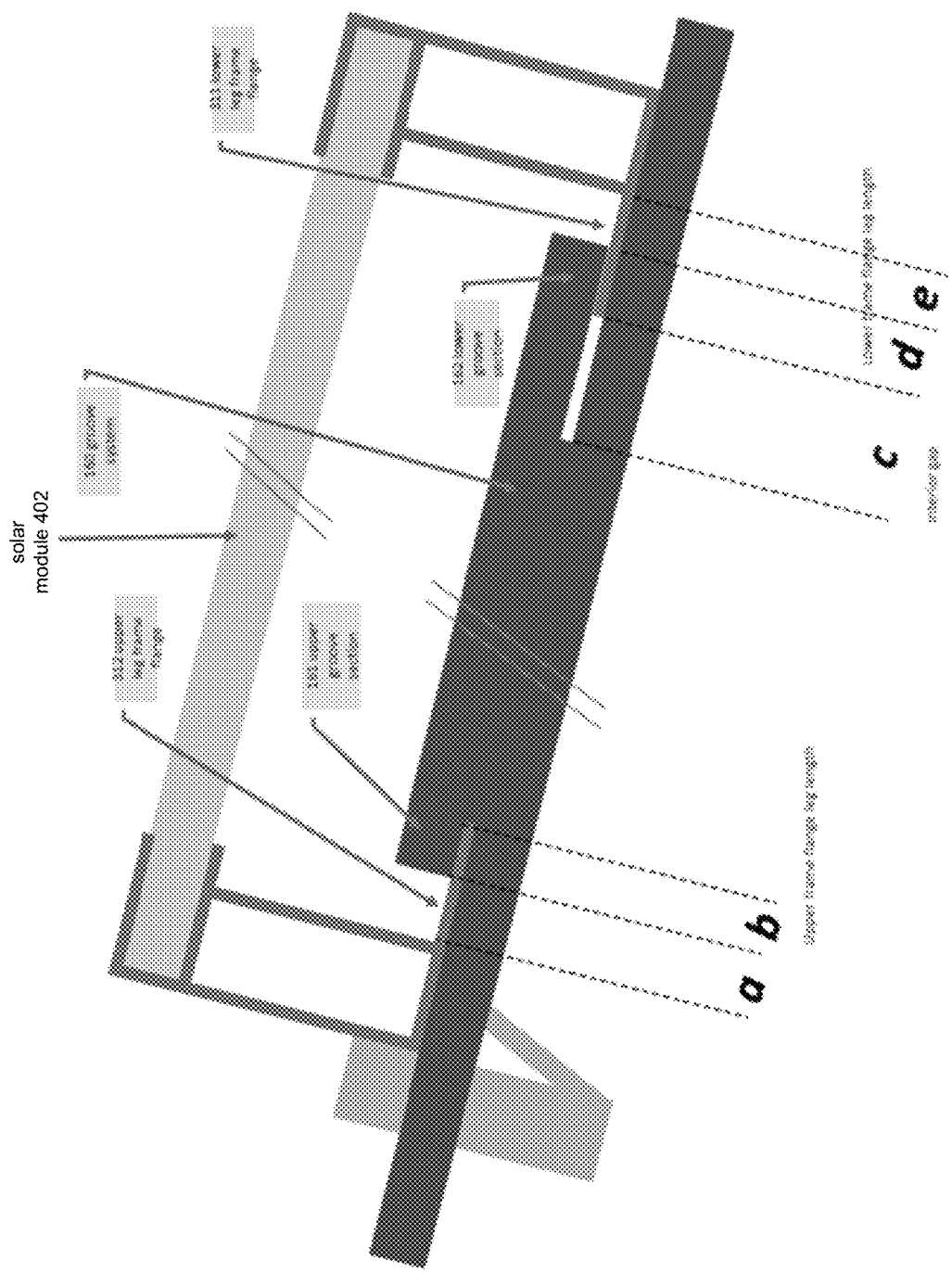
FIG. 4F depicts a side view of a solar panel installed via a groove-based attachment system consistent with some implementations of the current subject matter.

FIG. 4F depicts a side view of the solar panel 402 installed via the groove-based attachment system 160 consistent with some implementations of the current subject matter. In some implementations of the current subject matter, the solar module 310 is secured to the base 115 because a portion of the upper frame flange leg 312 (e.g., a length b) is held down by the upper grove section while a portion of the lower frame flange leg 311 (e.g., a length d) is held down by the lower groove section 162. A length c of the interior gap allows a lower frame flange leg 311 to be pulled into the lower groove section 162 such that an upper frame flange leg 312 can clear the upper groove section 161 and be placed on the lower support rim 122 along the rear wall 129 of the base 115. The difference between a length a and the length d can be determined based on an amount of clearance necessary for the upper frame flange leg 312 to clear the upper grove section 161.

Figure 5A:
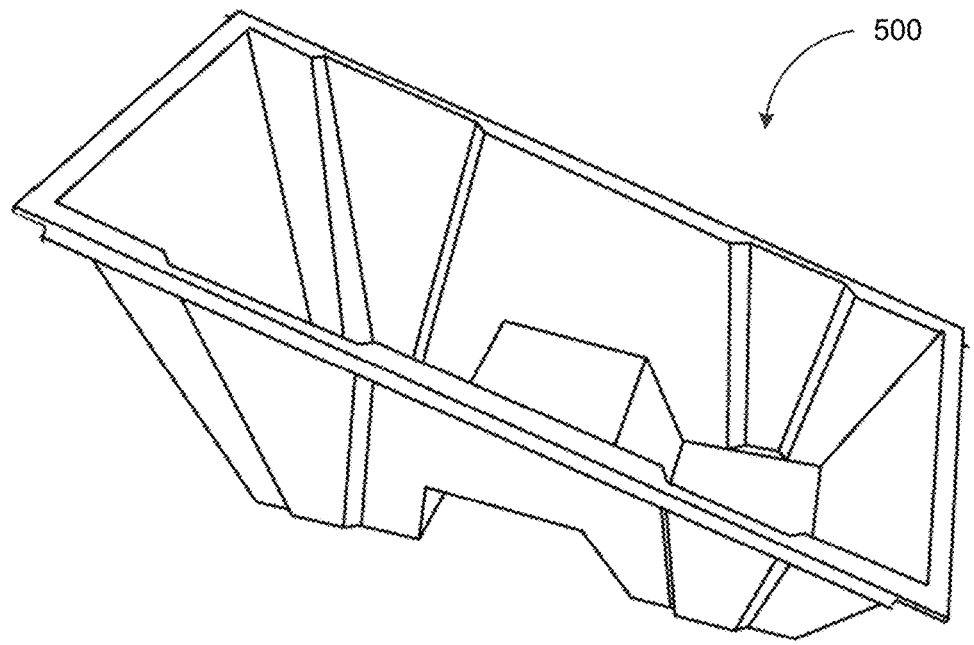
FIG. 5A depicts a perspective view of a ballasted mounting and support system having an alternate base configuration consistent with some implementations of the current subject matter.
Figure 5B:
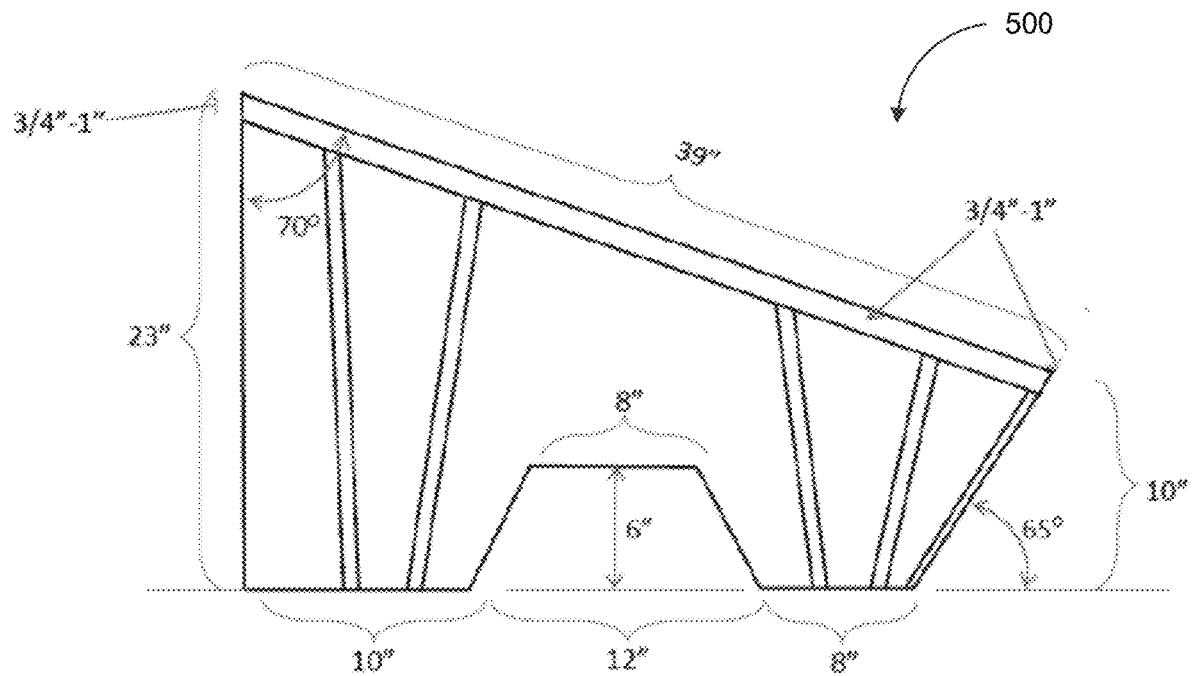
FIG. 5B depicts a side view of a ballasted mounting and support system having an alternate base configuration consistent with some implementations of the current subject matter.

FIG. 5A depicts a perspective view of a ballasted mounting and support system 500 having an alternate base configuration consistent with some implementations of the current subject matter. FIG. 5B depicts a side view of a ballasted mounting and support system 500 having an alternate base configuration consistent with some implementations of the current subject matter. Referring to FIGS. 5A-B, the ballasted mounting and support system 500 can include a hollow, free-standing base having a variegated bottom surface. That is, the bottom surface of the ballasted mounting and support system 500 can be configured with one or more protrusions and/or recesses instead of and/or in addition to the curved base shown in FIGS. 1A-1G. The grooves and/or recesses of the variegated base can provide added stability as well as heat and moisture dispersion. Furthermore, the grooves and/or recesses can form compartments within the cavity of the ballasted mounting and support system 500.

Figures 6A, 6B:
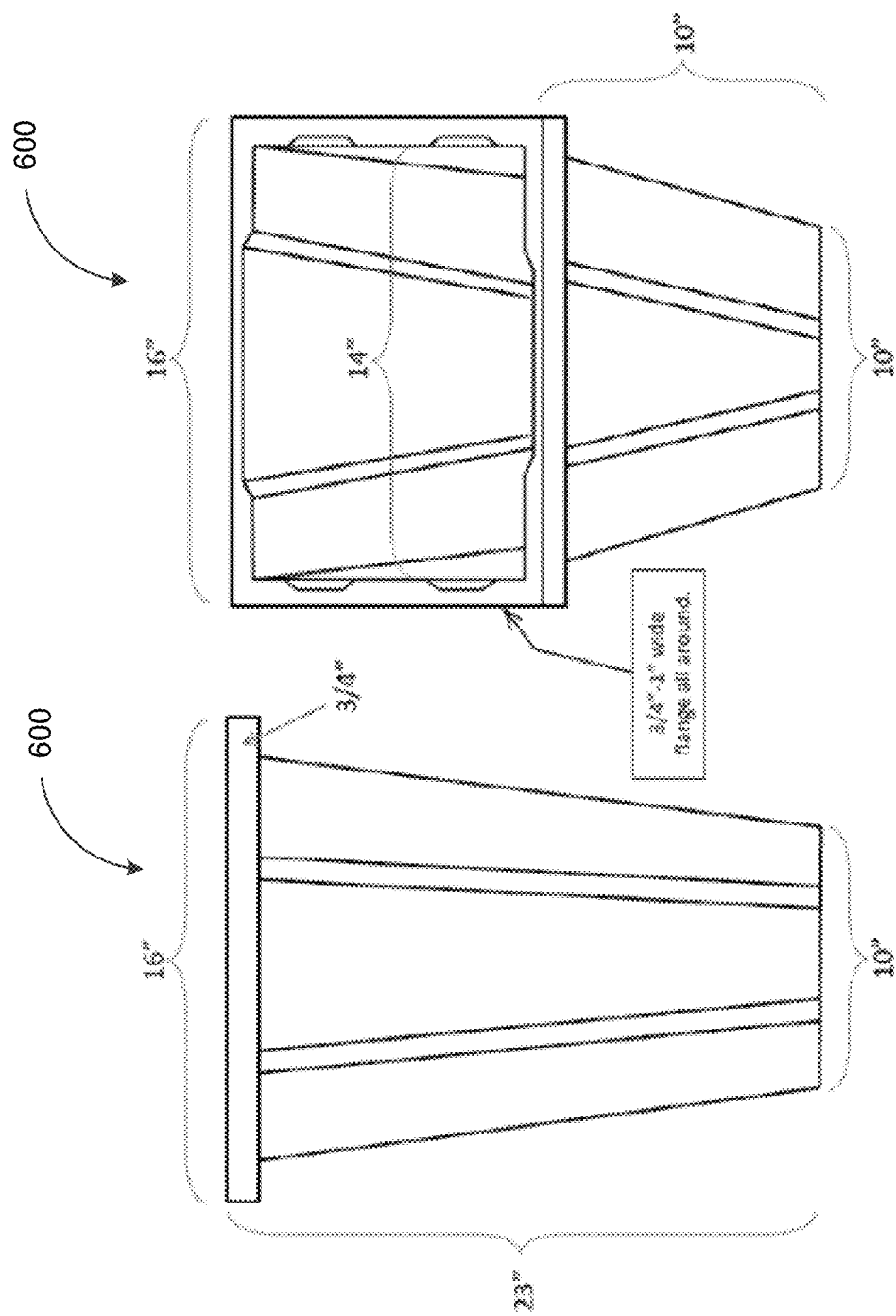
FIG. 6A depicts a rear view of a ballasted mounting and support system having an alternate base configuration consistent with some implementations of the current subject matter.
FIG. 6B depicts a perspective view of a ballasted mounting and support system having an alternate base configuration consistent with some implementations of the current subject matter.

FIG. 6A depicts a rear view of a ballasted mounting and support system 600 having an alternate base configuration consistent with some implementations of the current subject matter. FIG. 6B depicts a perspective view of the ballasted mounting and support system 600 having an alternate base configuration consistent with some implementations of the current subject matter. Referring to FIGS. 6A-B, the ballasted mounting and support system 600 can include a hollow, free-standing base having a flat bottom surface that lacks any curvature as well as any protrusions and/or recesses. The ballasted mounting and support system 600 with a flat bottomed base can be used for solar installations on flat and/or even surfaces.

Figure 7A:
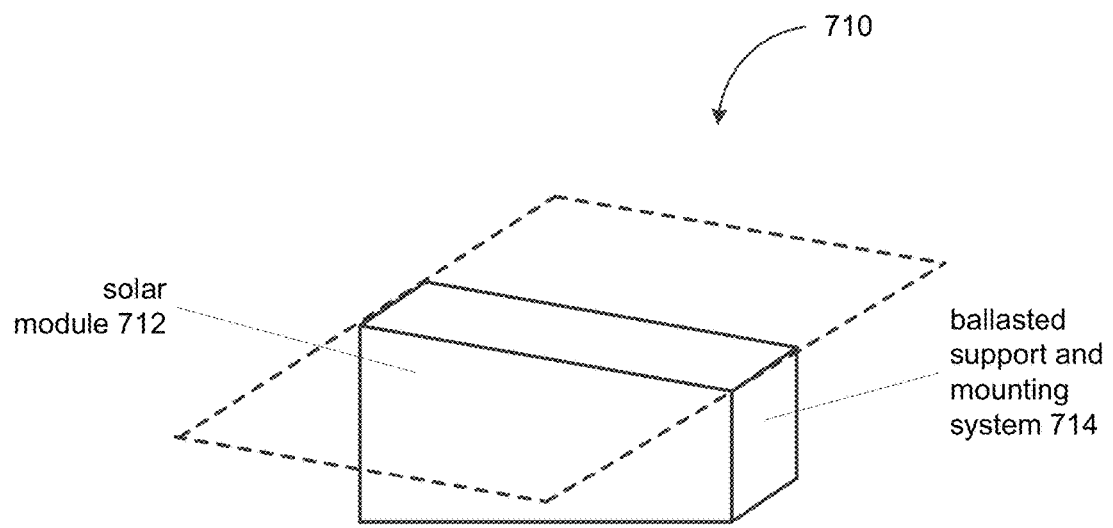
FIG. 7A depicts a solar installation consistent with some implementations of the current subject matter.
Figure 7B:
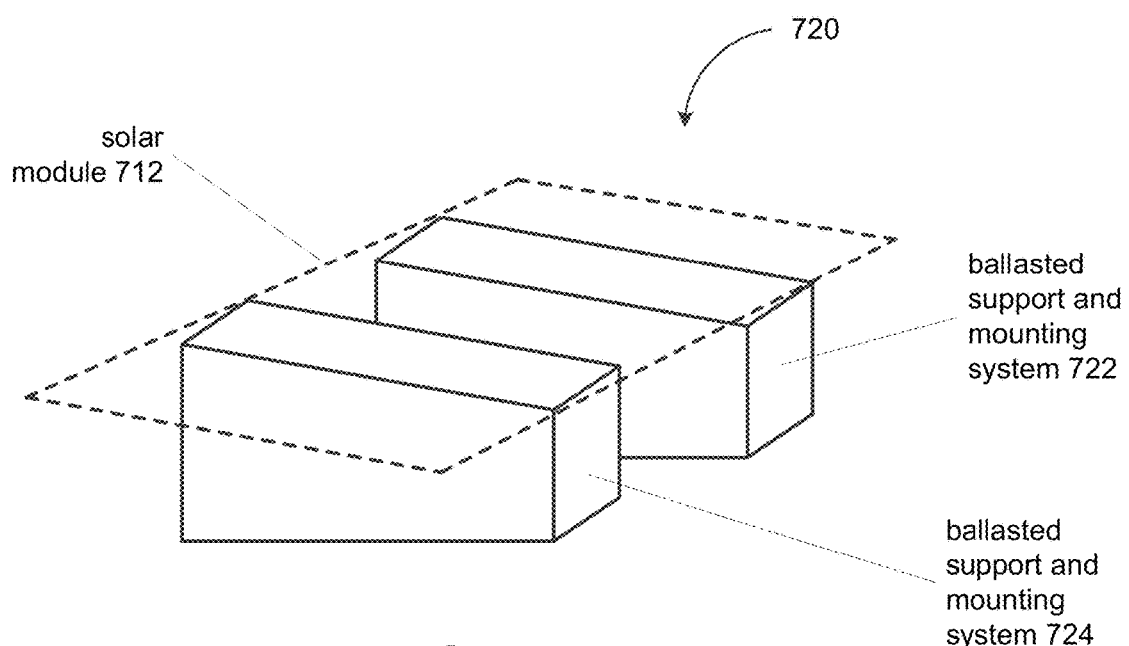
FIG. 7B depicts a solar installation consistent with some implementations of the current subject matter.
Figure 7C:
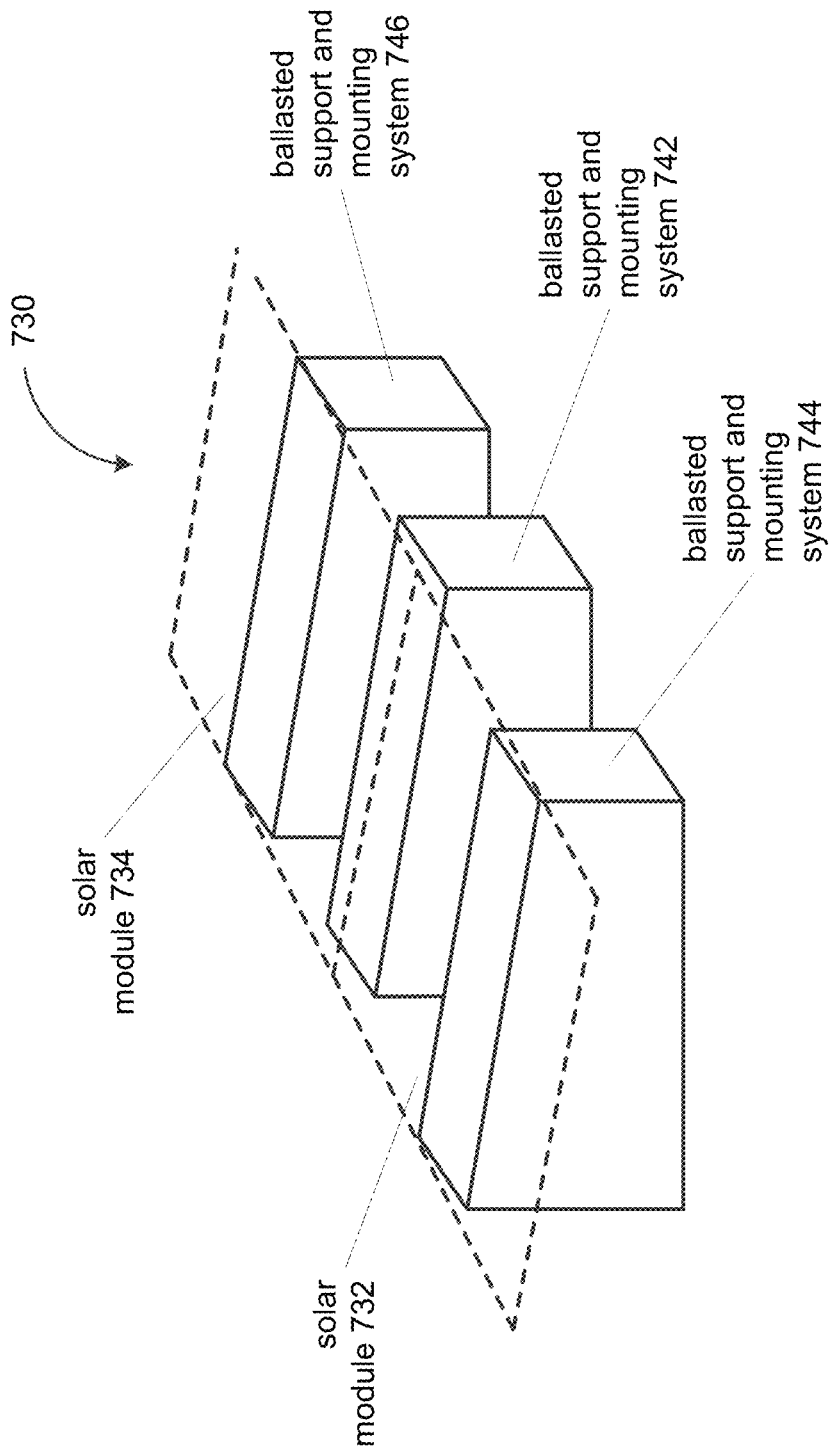
FIG. 7C depicts a solar installation consistent with some implementations of the current subject matter.
Figure 7D:
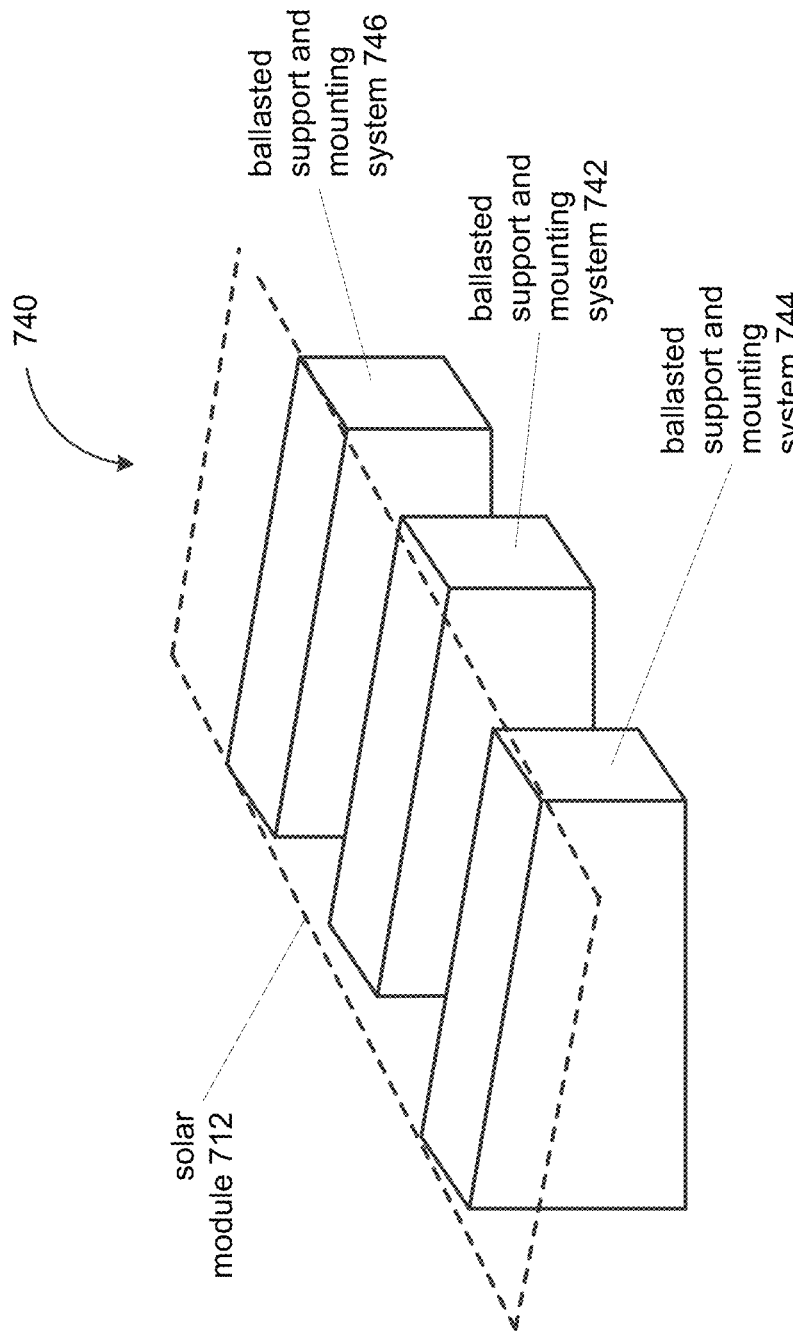
FIG. 7D depicts a solar installation consistent with some implementations of the current subject matter.

In some implementations of the current subject matter, a solar installation can be constructed using any number of solar modules and ballasted mounting and support systems. For example, FIG. 7A depicts a solar installation 710 consistent with some implementations of the current subject matter. As shown in FIG. 7A, a single solar module 712 can be installed using a single ballasted mounting and support system 714. Alternatively and/or additionally, a single solar module 712 can be installed using multiple ballasted mounting and support systems. For example, FIG. 7B depicts a solar installation 720 consistent with some implementations of the current subject matter. The solar installation 720 includes the solar module 712, which is mounted on and supported by both a first ballasted mounting and support system 722 and a second ballasted mounting and support system 724. FIG. 7D depicts a solar installation 740 consistent with some implementations of the current subject matter. The solar installation 740 includes the single solar module 712, which is mounted on and supported by a first ballasted mounting system 742, a second ballasted mounting system 744, and a third ballasted mounting system 746.

Alternatively and/or additionally, a single ballasted mounting and support system can be configured to mount and support multiple solar modules. For example, FIG. 7C depicts a solar installation 730 consistent with some implementations of the current subject matter. As shown in FIG. 7C, the first ballasted mounting and support system 742 can be configured to mount and support a first solar module 732, which is further mounted on and supported by a second ballasted mounting and support system 744. The first ballasted mounting and support system 742 can further be configured to mount and support a second solar module 734, which is also mounted on and supported by a third ballasted mounting and support system 746.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the steps or logic flow described herein in a certain order does not require the particular order stated or shown, or sequential order, to achieve desirable results. When examples are described, they are to include all types of examples encompassed by the phrases and/or terms used and are not limited to the particular examples mentioned. Other implementations may be within the scope of the following claims.

What is claimed is:

1. An apparatus for mounting and supporting one or more solar modules, the apparatus comprising:
  a front wall;
  a rear wall disposed across from the front wall;
  a base formed from a surface joining the front wall and the rear wall of the apparatus, the base of the apparatus comprising a hollow cavity with an open top and enclosed sides;
  a support rim along a top perimeter of the base, the support rim including a rear flange along the rear wall, and the support rim further including a front flange along the front wall; and
  an attachment mechanism for securing the one or more solar modules to the top perimeter of the base, the attachment mechanism including a top clip engaged with the rear flange and a bottom clip engaged with the front flange, the top clip and the bottom clip each having a channel for slidably receiving the one or more solar modules, and each channel being substantially parallel to the support rim in order to orient the one or more solar modules substantially parallel to the open top of the base.

2. The apparatus of claim 1, wherein the surface is flat such that the hollow cavity comprises a flat bottom.

3. The apparatus of claim 1, wherein the surface is curved such that the hollow cavity comprises a curved bottom protruding outward from the base of the apparatus, and wherein the curved bottom enables the apparatus to self-stabilize on a surface.

4. The apparatus of claim 3, wherein a radius of a curvature of the curved bottom changes along an axis that is parallel to the front wall and/or the rear wall.

5. The apparatus of claim 3, wherein a radius of a curvature of the curved bottom changes along an axis that is perpendicular to the front wall and/or the rear wall.

6. The apparatus of claim 1, wherein the base is configured to accommodate, within the hollow cavity of the base, one or more types of ballast.

7. The apparatus of claim 1, wherein the base further includes one or more protrusions and/or recesses along the front wall, the rear wall, and/or the curved surface joining the front wall and the rear wall, and wherein the one or more protrusions and/or recesses are configured to receive at least one divider for dividing the cavity of the base into a plurality of compartments.

8. The apparatus of claim 1, wherein the attachment mechanism further includes one or more holes disposed on a portion of the lower support rim along the rear wall of the base, and wherein the one or more holes are configured to receive one or more clips, pins, and/or lugs for securing the one or more solar modules to the base.

9. The apparatus of claim 1, wherein each channel includes a cushion element.

10. The apparatus of claim 1, wherein the support rim includes one or more recesses and/or protrusions configured to enable a dispersion of heat and/or moisture.

11. The apparatus of claim 1, wherein the support rim and the base are molded as a single piece.

12. The apparatus of claim 1, wherein the support rim is separate and detachable from the base.

13. The apparatus of claim 1, wherein the front wall of the base has a different height than the rear wall of the base to form a slope across a top of the base, and wherein the slope positions the one or more solar modules at an angle across the top of the base.

14. The apparatus of claim 1, wherein the top clip and/or the bottom clip are detachable from the base.

15. The apparatus of claim 1, wherein the top clip and/or the bottom clip and the base are molded as a single piece.

16. A method of installing one or more solar modules, comprising:
    securing, to a first one of an apparatus, a first solar module, the first solar module being secured to a top perimeter of the apparatus by at least sliding the first solar module substantially parallel to an open top of a base of the apparatus to engage the first solar module with an attachment mechanism of the apparatus, the apparatus further comprising a front wall, a rear wall disposed across from the front wall, a surface joining the front wall and the rear wall to form the base of the apparatus, and a support rim along the top perimeter of the base, the base of the apparatus comprising a hollow cavity with the open top and enclosed sides, the support rim including a rear flange along the rear wall, the support rim further including a front flange along the front wall, the attachment mechanism including a top clip engaged with the rear flange and a bottom clip engaged with the front flange, the top clip and the bottom clip each having a channel for slidably receiving the first solar module, and each channel being substantially parallel to the support rim in order to orient the first solar module substantially parallel to the open top of the base.

17. The method of claim 16, further comprising:
    securing, to the first one of the apparatus, a second solar module such that the first one of the apparatus mounts and supports the first solar module and the second solar module.

18. The method of claim 16, further comprising:
    securing, to a second one of the apparatus, the first solar module such that the first solar module is mounted on and supported by the first one of the apparatus and the second one of the apparatus.

19. The method of claim 16, further comprising:
    filling, with one or more types of ballast, the hollow cavity of the base.

20. The method of claim 16, further comprising:
    positioning the apparatus on a surface, the surface joining the front wall and the rear wall being curved such that the hollow cavity comprises a curved bottom protruding outward from the base of the apparatus, and the curved bottom enabling the apparatus to self-stabilize on the surface.

* * * * *